US007414100B2

(12) United States Patent
Jiang et al.

(10) Patent No.: US 7,414,100 B2
(45) Date of Patent: Aug. 19, 2008

(54) POLYMERIZATION PROCESS

(75) Inventors: Peijun Jiang, League City, TX (US); John Richard Shutt, Merchtem (BE); Charles Stanley Speed, Dayton, TX (US); Randall B. Laird, Pasadena, TX (US); Kevin Bruce Stavens, Seabrook, TX (US); Robert Olds Hagerty, La Porte, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/628,166

(22) PCT Filed: Jun. 20, 2005

(86) PCT No.: PCT/US2005/021644

§ 371 (c)(1),
(2), (4) Date: Nov. 30, 2006

(87) PCT Pub. No.: WO2006/009942

PCT Pub. Date: Jan. 26, 2006

(65) Prior Publication Data

US 2007/0244279 A1    Oct. 18, 2007

Related U.S. Application Data

(60) Provisional application No. 60/581,522, filed on Jun. 21, 2004.

(51) Int. Cl.
 C08F 2/06  (2006.01)
 C08F 6/06  (2006.01)
 C08F 10/02 (2006.01)

(52) U.S. Cl. .................. 526/206; 526/74; 528/482; 528/491

(58) Field of Classification Search .............. 526/74, 526/206; 528/482, 491
See application file for complete search history.

(56) References Cited

U.S. PATENT DOCUMENTS

| 2,474,571 | A |   | 6/1949  | Brakeley et al. |
| 2,494,585 | A |   | 1/1950  | Saylor et al. |
| 2,534,698 | A |   | 12/1950 | Calfee et al. |
| 2,548,415 | A |   | 4/1951  | Welch et al. |
| 2,603,626 | A |   | 7/1952  | Kolfenbach et al. |
| 2,644,809 | A |   | 7/1953  | Saylor et al. |
| 2,913,446 | A |   | 11/1959 | Cull et al. |
| 2,952,669 | A |   | 9/1960  | Bro et al. |
| 3,056,771 | A |   | 10/1962 | Aldridge et al. |
| 3,269,972 | A |   | 8/1966  | Banks et al. |
| 3,331,822 | A |   | 7/1967  | Kometani et al. |
| 3,397,166 | A |   | 8/1968  | Schmidle et al. |
| 3,440,219 | A |   | 4/1969  | Wolff et al. |
| 3,470,143 | A |   | 9/1969  | Schrage et al. |
| 3,493,530 | A |   | 2/1970  | Sianesi et al. |
| 3,528,954 | A |   | 9/1970  | Carlson et al. |
| 3,590,025 | A |   | 6/1971  | Tittle |
| 3,616,371 | A |   | 10/1971 | Ukihashi et al. |
| 3,642,742 | A |   | 2/1972  | Carlson |
| 3,723,270 | A | * | 3/1973  | Tabata et al. ................... 522/5 |
| 3,787,379 | A |   | 1/1974  | Ferren et al. |
| 3,919,183 | A |   | 11/1975 | Jager et al. |
| 3,996,281 | A |   | 12/1976 | Huber-Emden et al. |
| 4,016,342 | A |   | 4/1977  | Wagensommer |
| 4,042,634 | A |   | 8/1977  | Cope et al. |
| 4,100,225 | A |   | 7/1978  | Mueller |
| 4,123,602 | A |   | 10/1978 | Ukihashi et al. |
| 4,166,165 | A |   | 8/1979  | Hisasue et al. |
| 4,194,073 | A |   | 3/1980  | McDaniel |
| 4,338,237 | A |   | 7/1982  | Sulzbach et al. |
| 4,357,448 | A |   | 11/1982 | Tsubaki et al. |
| 4,373,093 | A |   | 2/1983  | Olson et al. |
| 4,381,387 | A |   | 4/1983  | Sulzbach |
| 4,424,324 | A |   | 1/1984  | Throckmorton et al. |

(Continued)

FOREIGN PATENT DOCUMENTS

EP    0 089 691    9/1983

(Continued)

OTHER PUBLICATIONS

U.S. Appl. No. 11/285,264, filed Nov. 22, 2005, Iaccino et al.

(Continued)

Primary Examiner—Fred M Teskin
(74) Attorney, Agent, or Firm—Catherine L. Bell

(57)    ABSTRACT

This invention relates to a process to increase the amount of polymer solute in a polymerization medium or effluent comprising introducing a fluorocarbon into the polymerization medium or effluent in an amount effective to increase the amount of polymer solute in the polymerization medium or effluent by at least 3% without causing precipitation of polymer solute from the polymerization medium or effluent, as compared to the same polymerization medium or effluent without the fluorocarbon present. This invention also relates to a process to reduce the viscosity of a polymerization medium or effluent comprising introducing a fluorocarbon into the polymerization medium or effluent in an amount effective to reduce the viscosity of the polymerization medium or effluent by at least 3% without causing precipitation of polymer solute from the polymerization medium or effluent, as compared to the same polymerization medium or effluent without the fluorocarbon present.

25 Claims, No Drawings

U.S. PATENT DOCUMENTS

| | | |
|---|---|---|
| 4,435,553 A | 3/1984 | Throckmorton et al. |
| 4,452,960 A | 6/1984 | Throckmorton |
| 4,499,249 A | 2/1985 | Nakagawa et al. |
| 4,508,881 A | 4/1985 | Throckmorton |
| 4,535,136 A | 8/1985 | Wheland |
| 4,588,790 A | 5/1986 | Jenkins, III et al. |
| 4,588,796 A | 5/1986 | Wheland |
| 4,626,608 A | 12/1986 | Scherer, Jr. et al. |
| 4,736,004 A | 4/1988 | Scherer, Jr. et al. |
| 4,900,777 A | 2/1990 | Ball et al. |
| 4,946,936 A | 8/1990 | Moggi et al. |
| 4,948,844 A | 8/1990 | Nakahara et al. |
| 4,950,724 A | 8/1990 | Malanga et al. |
| 5,032,656 A | 7/1991 | Mares et al. |
| 5,105,047 A | 4/1992 | Waller |
| 5,135,998 A | 8/1992 | Mares et al. |
| 5,182,342 A | 1/1993 | Feiring et al. |
| 5,281,680 A | 1/1994 | Grot |
| 5,286,822 A | 2/1994 | Krespan et al. |
| 5,310,870 A | 5/1994 | Peavy |
| 5,352,749 A | 10/1994 | DeChellis et al. |
| 5,405,922 A | 4/1995 | DeChellis et al. |
| 5,459,212 A | 10/1995 | Krespan et al. |
| 5,478,905 A | 12/1995 | Anolick et al. |
| 5,494,984 A | 2/1996 | Funaki et al. |
| 5,552,500 A | 9/1996 | Peavy |
| 5,556,821 A | 9/1996 | Aida et al. |
| 5,608,002 A | 3/1997 | Kubo et al. |
| 5,624,878 A | 4/1997 | Devore et al. |
| 5,663,251 A | 9/1997 | Kato et al. |
| 5,663,255 A | 9/1997 | Anolick et al. |
| 5,665,838 A | 9/1997 | Peavy |
| 5,668,250 A | 9/1997 | Malik |
| 5,668,251 A | 9/1997 | Malik et al. |
| 5,674,957 A | 10/1997 | DeSimone et al. |
| 5,688,838 A | 11/1997 | Abusleme et al. |
| 5,703,194 A | 12/1997 | Malik et al. |
| 5,769,927 A | 6/1998 | Gottschlich et al. |
| 5,780,565 A | 7/1998 | Clough et al. |
| 5,789,504 A | 8/1998 | Ihara et al. |
| 5,807,977 A | 9/1998 | Malik et al. |
| 5,821,311 A | 10/1998 | Mosbach et al. |
| 5,872,198 A | 2/1999 | Mosbach et al. |
| 5,939,501 A | 8/1999 | DeSimone et al. |
| 5,939,502 A | 8/1999 | DeSimone et al. |
| 5,959,050 A | 9/1999 | Mosbach et al. |
| 5,981,673 A | 11/1999 | DeSimone et al. |
| 5,990,251 A | 11/1999 | Gelus |
| 6,037,483 A | 3/2000 | Malik et al. |
| 6,096,840 A | 8/2000 | Bernier et al. |
| 6,107,423 A | 8/2000 | Wheland et al. |
| 6,111,062 A | 8/2000 | Shirota et al. |
| 6,133,389 A | 10/2000 | Anolick et al. |
| 6,225,367 B1 | 5/2001 | Chaouk et al. |
| 6,228,963 B1 | 5/2001 | Wheland et al. |
| 6,271,319 B1 | 8/2001 | Baker et al. |
| 6,306,989 B1 | 10/2001 | Bloom et al. |
| 6,335,408 B1 | 1/2002 | Russo et al. |
| 6,337,373 B1 | 1/2002 | Formaro et al. |
| 6,346,587 B1 | 2/2002 | Krüger et al. |
| 6,372,838 B1 | 4/2002 | Rao et al. |
| 6,380,351 B1 | 4/2002 | Malik et al. |
| 6,399,729 B1 | 6/2002 | Farnham et al. |
| 6,417,314 B1 | 7/2002 | Malik et al. |
| 6,423,798 B2 | 7/2002 | Wheland et al. |
| 6,448,368 B1 | 9/2002 | Malik et al. |
| 6,455,650 B1 | 9/2002 | Lipian et al. |
| 6,469,116 B2 | 10/2002 | Maccone et al. |
| 6,469,185 B1 | 10/2002 | Russo et al. |
| 6,486,280 B1 | 11/2002 | Anolick et al. |
| 6,534,613 B2 | 3/2003 | Ford et al. |
| 6,716,942 B1 * | 4/2004 | Saito et al. .................. 526/242 |
| 2001/0012880 A1 | 8/2001 | Wheland et al. |
| 2001/0018144 A1 | 8/2001 | Watakabe et al. |
| 2002/0002219 A1 | 1/2002 | Bloom et al. |
| 2002/0028884 A1 | 3/2002 | Formaro et al. |
| 2002/0032291 A1 | 3/2002 | Farnham et al. |
| 2002/0052454 A1 | 5/2002 | Lipian et al. |
| 2002/0055580 A1 | 5/2002 | Lorah et al. |
| 2002/0055581 A1 | 5/2002 | Lorah et al. |
| 2002/0055599 A1 | 5/2002 | Slone |
| 2002/0065383 A1 | 5/2002 | Maccone et al. |
| 2002/0086908 A1 | 7/2002 | Chou et al. |
| 2002/0128411 A1 | 9/2002 | Navarrini et al. |
| 2002/0132910 A1 | 9/2002 | Rao et al. |
| 2002/0151664 A1 | 10/2002 | Farnham et al. |
| 2002/0183457 A1 | 12/2002 | Hintzer et al. |
| 2002/0183471 A1 | 12/2002 | Russo et al. |
| 2003/0023013 A1 | 1/2003 | Lipian et al. |

FOREIGN PATENT DOCUMENTS

| | | |
|---|---|---|
| EP | 0 076 511 | 1/1986 |
| EP | 0 271 243 | 10/1991 |
| EP | 0 369 727 | 2/1994 |
| EP | 0 459 320 | 8/1995 |
| EP | 1 323 746 | 7/2003 |
| EP | 1 347 001 | 4/2006 |
| JP | 61007307 | 1/1986 |
| JP | 7033821 B | 2/1995 |
| JP | 11349606 A | 12/1999 |
| RU | 2195465 | 12/2002 |
| WO | WO92/12182 | 7/1992 |
| WO | WO94/17109 | 8/1994 |
| WO | WO96/24625 | 8/1996 |
| WO | WO96/33227 | 10/1996 |
| WO | WO98/34967 | 8/1998 |
| WO | WO00/47641 | 8/2000 |
| WO | WO00/50209 | 8/2000 |
| WO | WO00/53682 | 9/2000 |
| WO | WO01/49757 | 7/2001 |
| WO | WO01/49758 | 7/2001 |
| WO | WO01/49760 | 7/2001 |
| WO | WO02/04120 | 1/2002 |
| WO | WO02/34794 | 5/2002 |
| WO | WO02/051875 | 7/2002 |
| WO | WO02/059161 | 8/2002 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

"A Low-Energy Solvent Separation Method," T. G. Gutowski et al., Polymer Engineering; "Solvents" by C. A. Irani et al., Journal of Applied Polymer Science vol. 31, 1879-1899 (1986).

"Separating Polymer Solutions with Supercritical Fluids," Mark A. McHugh et al., Macromolecules 1985, 18, 674-680.

"Critical dynamics and phase-separation kinetics in dynamically asymmetric binary fluids: New dynamic universality class for polymer mixtures or dynamic crossover?," Hajime Tanaka, Journal of Chemical Physics 100 (7), Apr. 1, 1994, 5323-5337.

"Short Chain Branching Effect on the Cloud-Point Pressures of Ethylene Copolymers in Subcritical and Supercritical Propane," S. J. Han et al., Macromolecules 1998, 31, 2533-2538.

"Designing Solvent Solutions," Chemical & Engineering News, Oct. 13, 2003, vol. 81, No. 41.

"Polymer Synthesis Using Hydrofluorocarbon Solvents," Colin Wood et al., Macromolecules, vol. 35, No. 18, 6743-6746, 2002.

"Perfluorinated polyethers for the immobilisation of homogeneous nickel catalysts," W. Keim et al., Journal of Molecular Catalysis A: Chemical 139 (1999) 171-175.

"An Improved Gas-Phase Polypropylene Process," Ross et al., *Ind. Eng. Chem. Prod. Res. Dev.* 1985, 24, 149-154.

"Adsorption of 1,1,1,2-Tetrafluoroethane on Activated Charcoal," Basavaraj S. Akkimaradi et al., J. Chem. Eng. Data 2001, 46, 417-422.

* cited by examiner

POLYMERIZATION PROCESS

This application is the national phase entry into the United States Patent Office of international application number PCT/US2005/021644 filed Jun. 20, 2005, which claims benefit of and priority to U.S. Provisional Patent Application Ser. No. 60/581,522 filed Jun. 21, 2004.

FIELD OF THE INVENTION

This invention relates to the use of a fluorocarbon in a polymerization process to reduce the viscosity of the polymerization medium or effluent and or to increase the amount of solute in the polymerization medium or effluent.

BACKGROUND OF THE INVENTION

Unsaturated monomers, particularly olefin monomers, are polymerized in a variety of polymerization processes using a wide variety of catalysts and catalyst systems. One of the most common polymerization processes used in the production of olefin based polymers such as polyethylene, polypropylene, polybutene, etc, is a solution based process. In such a process the formed polymer is dissolved in the polymerization medium. Often, the catalyst and monomer are also dissolved in the polymerization medium, but that is not a requirement of a "solution" process. In typical solution processes, the polymerization temperature may be at, above or below the melting point of the dry polymer. For example, in typical solution phase polyethylene processes, polymerization takes place in a hydrocarbon solvent at temperatures above the melting point of the polymer and the polymer is typically recovered by vaporization of the solvent and any unreacted monomer. In some cases solvents are used while in others, the monomer to be polymerized also acts as the solvent (e.g. a bulk process).

In each of these processes, there remain factors that influence not only the rate and volume at which the polymerization can run, but can also influence the properties of polymer produced. In a typical solution process, the polymer formed is dissolved in the solvent. The higher the concentration of the polymer in the solvent, the higher the viscosity of the polymerization reaction mixture (also called polymerization medium or medium) containing polymer, monomers and solvent. High viscosity in the polymerization reactor associated with solution process is often a limiting step for process efficiency and polymer production. High viscosity can lead to difficulties in efficient mixing in the reactor, difficulties in maintaining a homogeneous system, difficulties in avoiding product property drift (heterogeneity), and, process control problems. This is especially true for polymerization processes where the polymers produced are to have a molecular weight higher than the entanglement molecular weight. Higher operating temperature may help address these problems by reducing the viscosity of the polymerization medium, however the molecular weight of the polymer product tends to decrease with reaction temperature. Thus production of higher molecular weight polymers in solution processes is limited by the viscosity of the polymerization medium. This problem exists even with the advent of new catalyst systems. Metallocene catalysts (e.g. group 4-7 transition metal compounds having at least one cyclopentadienyl group attached to the metal) allow polymerizations to be performed at a high temperatures, such that a higher polymer concentration of higher molecular weight copolymers (e.g., 16-18 wt % for ethylene-propylene-diene monomer copolymers) can be achieved in the reactor effluent without significant operation difficulties as compared to a conventional solution process (e.g., 7-13 wt % at 30-50° C. for ethylene-propylene-diene monomer copolymers). Similarly, high reaction temperatures tend to improve the polymerization rate and solvent recovery in a solution process, however, the polymer concentration still tends to be much lower than that in an equivalent slurry process. Further, it is also difficult to produce high molecular weight polymers (>100 Mooney) in a solution process due to the nature of high viscosity of a polymer having a Mooney viscosity of 100 or more. Thus there is a need in the art for a means to reduce the viscosity and/or increase the polymer concentration in a solution polymerization process, among other things.

Likewise, viscosity and other characteristics of a polymer solution are also important factors in determining process parameters, such as throughput, volume, temperature and the like. In some systems, it is possible to have a higher amount of polymer solute present, however the viscosity of that solution makes it difficult to handle,—i.e. the more viscous the solution, the more difficult it is to pump and the more likely it is to foul. Thus the process may also be limited by solution viscosity and there is a need in the art for means to reduce solution viscosity while maintaining or even increasing solute concentration.

U.S. Pat. No. 3,470,143 discloses a process to produce a boiling-xylene soluble polymer in a slurry using certain fluorinated organic carbon compounds.

U.S. Pat. No. 5,990,251 discloses a gas phase process using a Ziegler-Natta catalyst system modified with a halogenated hydrocarbon, such as chloroform.

EP 0 459 320 A discloses polymerization in polar aprotic solvents, such as halogenated hydrocarbons.

U.S. Pat. No. 5,780,565 discloses dispersion polymerizations of polar monomers under super-atmospheric conditions such that the fluid is a liquid or supercritical fluid, the fluid being carbon dioxide, a hydrofluorocarbon, a perfluorocarbon or a mixture thereof.

U.S. Pat. No. 5,624,878 discloses the polymerization using "constrained geometry metal complexes" of titanium and zirconium.

U.S. Pat. No. 2,534,698, U.S. Pat. No. 2,644,809 and U.S. Pat. No. 2,548,415 disclose preparation of butyl rubber type elastomers in fluorinated solvents.

U.S. Pat. No. 6,534,613 discloses use of hydrofluorocarbons as catalyst modifiers.

U.S. Pat. No. 4,950,724 disclose the polymerization of vinyl aromatic monomers in suspension polymerization using fluorinated aliphatic organic compounds.

WO 02/34794 discloses free radical polymerizations in certain hydrofluorocarbons.

WO 02/04120 discloses a fluorous bi-phasic systems.

WO 02/059161 discloses polymerization of isobutylene using fluorinated co-initiators.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature, further a mixture of 30% perfluoromethylcyclohexane in heptane was used to cause the polymer in the slurry to float.

Additional references of interest include:

Designing Solvent Solutions, Chemical and Engineering News, Oct. 13, 2003 (www.CEN-online.org); Polymer Synthesis Using Hydrofluorocarbon Solvents, Wood, Colin, et al. Macromolecules, Vol. 35, Number 18, pages 6743-6746, 2002; Perfluorinated Polyethers for the Inmobilisation of Homogeneous Nickel Catalysts, Keim, W. et al., Journal of Molecular Catalysis A: Chemical 139 (1999) 171-175; RU2195465; US20020086908 A1; WO200251875 A1; US2002/0032291 A1; U.S. Pat. Nos. 3,397,166; 3,440,219; 6,111,062; 5,789,504; 5,703,194; 5,663,251; 5,608,002; 5,494,984; 5,310,870; 5,182,342; 2,603,626; 2,494,585; 2,474,571; WO 02/051875 A1; U.S. Pat. Nos. 6,133,389; 6,096,840; 6,107,423; 6,037,483; 5,981,673; 5,939,502; 5,939,501; 5,674,957; 5,872,198; 5,959,050; 5,821,311; 5,807,977; 5,688,838; 5,668,251; 5,668,250; 5,665,838; 5,663,255; 5,552,500; 5,478,905; 5,459,212; 5,281,680; 5,135,998; 5,105,047; 5,032,656; 4,166,165; 4,123,602; 4,100,225; 4,042,634; US 2002/0132910 A1; US 2002/0151664 A1; US 2002/0183457 A1; US 2002/0183471 A1; US 2003/0023013 A1; US 2001/0012880 A1; US 2001/0018144 A1; US 2002/0002219 A1; US 2002/0028884 A1; US 2002/0052454 A1; US 2002/0055580 A1; US 2002/0055581; US 2002/0055599 A1, US 2002/0065383; US 2002/0086908 A1; US 2002/0128411 A1; U.S. Pat. Nos. 3,269,972, 3,331,822; US

SUMMARY OF THE INVENTION

This invention relates to a solution olefin polymerization process, in which the olefin polymer is present as a solute in a polymerization medium, comprising introducing a fluorinated hydrocarbon into the polymerization medium in an amount effective to increase the amount of polymer solute in the polymerization medium by at least 3%, as compared to the same polymerization medium without the fluorinated hydrocarbon present, without causing precipitation of polymer solute from the polymerization medium.

This invention relates to a process to increase the amount of olefin polymer solute in a polymerization medium or effluent comprising introducing a fluorocarbon into the olefin polymerization medium or effluent in an amount effective to increase the amount of polymer solute in the polymerization medium or effluent by at least 3% without causing precipitation of polymer solute from the polymerization medium or effluent, as compared to the same polymerization medium or effluent without the fluorocarbon present.

This invention also relates to a process to reduce the viscosity of a polymerization medium or effluent comprising introducing a fluorocarbon into the polymerization medium or effluent in an amount effective to reduce the viscosity of the polymerization medium or effluent by at least 3% without causing precipitation of polymer solute from the polymerization medium or effluent, as compared to the same polymerization medium or effluent without the fluorocarbon present.

This invention also relates to a process to increase the polymer solute present in a polymerization medium or effluent and reduce the viscosity of a polymerization medium or effluent comprising introducing a fluorocarbon into the polymerization medium or effluent in an amount effective to increase the amount of polymer solute present by at least 1%, and reduce the viscosity of the polymerization medium or effluent by at least 3% without causing precipitation of polymer solute from the polymerization medium or effluent, as compared to the same polymerization medium or effluent without the fluorocarbon present.

This invention also relates to a solution polymerization process for producing a polyolefins, in which the polyolefin forms a solute in a polymerization medium, comprising introducing a fluorinated hydrocarbon into the polymerization medium in an amount effective to increase the amount of polymer solute in the polymerization medium by at least 3%, as compared to the same polymerization medium without the fluorinated hydrocarbon present, without causing precipitation of polymer solute from the polymerization medium.

Definitions

For purposes of this invention and the claims thereto, the term copolymers means any polymer comprising two or more monomers.

For the purposes of this invention and the claims thereto when a polymer is referred to as comprising a monomer, the olefin present in the polymer is the polymerized form of the monomer. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

As used herein, the new notation numbering scheme for the Periodic Table Groups are used as set out in CHEMICAL AND ENGINEERING NEWS, 63 (5), 27 (1985).

As used herein, Me is methyl, t-Bu and $^t$Bu are tertiary butyl, iPr and $^i$Pr are isopropyl, Cy is cyclohexyl, and Ph is phenyl.

For purposes of this disclosure, the term oligomer refers to compositions having 2-75 mer units and the term polymer refers to compositions having 76 or more mer units. A mer is defined as a unit of an oligomer or polymer that originally corresponded to the monomer(s) used in the oligomerization or polymerization reaction. For example, the mer of polyethylene would be ethylene.

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety.

The transition metal compound may be neutral as in a precatalyst, or a charged species with a counter ion as in an activated catalyst system.

Catalyst precursor is also often referred to as precatalyst, catalyst, catalyst compound, catalyst precursor, transition metal compound or transition metal complex. These words are used interchangeably. Activator and cocatalyst are also used interchangeably.

DETAILED DESCRIPTION

This invention relates in part to a solution process for polymerization using fluorinated hydrocarbon(s) or a mixture of fluorinated hydrocarbons and hydrocarbon solvents to provide a means of increasing polymer solute concentration and/or reducing viscosity of polymerization medium without polymer precipitation. Without wishing to be bound by any theory, we believe that one can select one or more fluorocarbons to add in controlled amounts to the hydrocarbon polymer solution such that the medium remains single phase, e.g. homogeneous, and or that the interaction effect between the fluorinated hydrocarbon and the dissolved polymer somehow contributes to causing the polymer chain to have a smaller coil dimension partially thereby decreasing the potential polymer-polymer entanglements and thus decreasing the solution viscosity.

This invention further relates to a modified polymerization process, where the polymer is in solution in the polymerization medium or effluent and the viscosity of the polymerization effluent exiting the reactor is modified by the addition of a fluorocarbon and or the amount of polymer solute in the solvent medium or effluent is increased (as compared to the same system without the fluorocarbon). Preferably, the fluorocarbon is added in an amount such that the polymer remains in solution and does not precipitate. Preferably the fluorocarbon has the effect of increasing the amount of polymer solute present in the polymerization medium and/or effluent and or reducing the viscosity of the polymerization medium and/or effluent (as compared to the same system without the fluorocarbon). The fluorocarbon may be added before, during or after the polymerization. Likewise the fluorocarbon may be added at the reactor exit or during recovery processes after the polymer has exited the reactor. Likewise the fluorocarbon may be added to the reactor as part of the monomer stream, the catalyst feed or with any other component, or may be added alone.

In a preferred embodiment, one or more fluorocarbons are added to a polymerization process in a polymerization reactor in an amount effective to reduce the viscosity of the polymerization medium or effluent by 10 centipoise, preferably by at least 25 centipoise, more preferably at least 50 centipoise, more preferably at least 100 centipoise, more preferably at least 500 centipoise, more preferably at least 1000 centipoise, more preferably at least 2000 centipoise as compared to the exact same polymerization medium or effluent without the fluorocarbon.

In a preferred embodiment, one or more fluorocarbons are added to a polymerization process in a polymerization reactor in an amount effective to reduce the viscosity of the polymerization medium or effluent by at least 3%, preferably by at least 5%, preferably by at least 10%, more preferably at least 15%, more preferably at least 20% as compared to the exact same polymerization medium or effluent without the fluorocarbon. The viscosity of the polymerization medium or the effluent is measured using a rotational viscometer developed by Geerissen, H., F. Gemandt, B. A. Wolf, and H. Lentz ("Pressure dependence of viscometric relaxation times measured with a new apparatus-WLF behavior of moderately concentrated solutions of poly(n-butylmethacrylate)s in 2-propanol," Makromol. Chem. 192, 165-176, 1991). The apparatus consists of a measuring head and a high-pressure cell which is designed for a maximum pressure of 320 MPa. The cylindrical mantle has a height of 150 mm and an outside diameter of 100 mm. The main part contains a rotor that can be moved in a coaxial stator. The stator has an inside diameter of 35.24 mm and is fixed in a holder. The height of the rotor is 58 mm, and the outside diameter is 35.05 mm. The high-pressure cell is sealed by an O-ring placed between the holder and the outside mantle. To drive the rotor, a measuring head is arranged above the cell. A motor at its top generates torque which is transmitted to the lower cylinder via a shaft. The cylinder contains permanent magnets that have counterparts inside the rotor. Through the antimagnetic holder rotational movement is transferred. The maximum shear stress achievable without slippage of the magnetic coupling is 420 Pa. The polymer sample is first dissolved in a solvent at a given concentration, and the polymer solution is homogenized in an autoclave reactor. After homogenizing the polymer solution, it is fed into an electrically heated viscometer via a short high-pressure tube. The preset pressure is then adjusted by a metal bellows arranged inside the autoclave. The viscometer is controlled by a computer. Additional torque due to viscous flow of the polymer solution is transmitted to the measuring head and causes drilling of the spring. The angle of drilling is used to determine the torque from which the dynamic viscosity is calculated.

In another embodiment, this invention relates to a method to increase the amount of polymer solute present in a polymerization medium or a polymerization effluent by at least 3% (preferably by at least 5%, more preferably by at least 7%, more preferably by at least 10%, more preferably by at least 15%, more preferably by at least 20%) by introducing a fluorocarbon into the polymerization medium or effluent in an amount effective to increase the amount of polymer solute without causing precipitation of the polymer solute, as compared to the exact same medium or effluent without the fluorocarbon. The amount of polymer solute present in a polymerization medium or effluent at a given temperature is determined by separation of the polymer from volatiles in a laboratory evaporation experiment on a small sample of the reaction medium. The testing procedure is described as follows: A small amount (100 ml) of polymerization medium is sampled under the reaction condition into a stainless steel vessel of known weight. The sample vessel is then weighed to obtain the amount of polymerization medium sampled. The sample is discharged into an open container placed in a hood to evaporate the solvent and unreacted monomer. The separated polymer is further dried in a vacuum oven at 90° C. for about 12 hours. The vacuum oven dried samples is weighed to obtain the amount of polymer in the polymer solute. The weight % polymer solute present=[(the weight of the dry polymer)/(the weight of the reaction medium)]×100.

In a preferred embodiment, the polymerization process is one where the monomer(s) to be polymerized are used as the reaction medium (regardless of whether the monomers act as solvent or diluent) and one or more fluorocarbons are added to the polymerization reactor in an amount effective to increase the polymer solute present in a polymerization medium or a polymerization effluent by at least 3% (preferably by at least 5%, more preferably by at least 7%, more preferably by at least 10%, more preferably by at least 15%, more preferably by at least 20%) without causing precipitation of the polymer solute, as compared to the exact same medium or effluent without the fluorocarbon. Alternatively or additionally, the polymerization process is one where the monomer(s) to be polymerized are used as the reaction medium (regardless of whether the monomers act as solvent or diluent) and one or more fluorocarbons are added to the polymerization reactor in an amount effective to reduce the viscosity of the medium or effluent by at least 3%, preferably by at least 5%, preferably by at least 10%, more preferably at least 15%, more preferably at least 20% as compared to the exact same polymerization medium or effluent without the fluorocarbon.

In a preferred embodiment, the polymerization process is one where the reaction medium comprises a hydrocarbon fluid (regardless of whether the fluid acts as solvent or diluent) and one or more fluorocarbons are added to the polymerization reactor in an amount effective to increase the polymer solute present in a polymerization medium or a polymerization effluent by at least 1%, preferably at least 3% (preferably by at least 5%, more preferably by at least 7%, more preferably by at least 10%, more preferably by at least 15%, more preferably by at least 20%) without causing precipitation of the polymer solute, and or in an amount effective to reduce the viscosity of the medium or effluent by at least 3%, preferably by at least 5%, preferably by at least 10%, more preferably at least 15%, more preferably at least 20% as compared to the exact same medium or effluent without the fluorocarbon. Preferably, the hydrocarbon solvent is an aliphatic or aromatic hydrocarbon. Examples of suitable, preferably inert, solvents include, for example, saturated hydrocarbons containing from 3 to 8 carbon atoms, such as propane, n-butane, isobutane, cyclopentane, n-pentane, isopentane, neopentane, n-hexane, isohexane, cyclohexane, and other saturated $C_6$ to $C_8$ hydrocarbons.

In a preferred embodiment the fluorocarbons are added in an amount effective to reduce the viscosity of the polymerization medium or effluent by 10 centipoise, preferably by at least 200 centipoise, more preferably at least 300 centipoise, more preferably at least 500 centipoise without causing precipitation of the polymer solute, as compared to the exact same medium or effluent without the fluorocarbon.

In a preferred embodiment the fluorocarbons are added in an amount effective to increase the polymer solute present in a polymerization medium or a polymerization effluent by 1 to 50%, preferably by 3 to 45%, more preferably by 5 to 40%, more preferably by 10 to 35%, more preferably by 15 to 30%, more preferably by 20 to 30% without causing precipitation of the polymer solute, as compared to the exact same medium or effluent without the fluorocarbon.

In a preferred embodiment the fluorocarbons are added in an amount effective to reduce the viscosity of the medium or effluent by at least 5%, preferably by at least 10%, more preferably at least 15%, more preferably at least 20% without causing precipitation of the polymer solute, as compared to the exact same medium or effluent without the fluorocarbon.

By the phrase "without causing precipitation of the polymer solute" is meant that the fluorocarbon does not cause precipitation of polymer out of solution or if it does cause a minor amount of precipitation, that it is insignificant enough to not cause fouling in the selected reactor system. In particular the phrase "without causing precipitation of the polymer solute" means that the fluorocarbon does not cause precipitation of more than 1 weight % polymer out of solution, preferably that the fluorocarbon does not cause precipitation of more than 0.5 weight % polymer out of solution, preferably that the fluorocarbon does not cause precipitation of more than 0.1 weight % polymer out of solution, preferably that the fluorocarbon does not cause precipitation of more than 0.01 weight % polymer out of solution, preferably that the fluorocarbon does not cause precipitation of more than 0.001 weight % polymer out of solution. Amount of polymer (weight %) precipitate present in a polymerization medium or effluent is determined by measuring the intensity of a transmitted light of the polymer solution at polymerization reaction condition. Presence of polymer precipitates causes light intensity decay. The ratio of light intensity transmitted through polymerization medium with presence of polymer precipitates to the light intensity transmitted through the polymerization medium without polymer precipitate is correlated to the concentration of polymer precipitates in the reaction medium.

In a preferred embodiment, the fluorocarbons are present in the polymerization medium at 1 to 50 volume %, based upon the volume of the medium, preferably the fluorocarbons are present at 5 to 40 volume %, preferably 5 to 30 volume %, more preferably at 10 to 30 volume %, more preferably 10 to 20 volume %. In a preferred embodiment, the fluorocarbon is present in the polymerization medium at 0.1 to 20 volume %, more preferably 1 to 15 volume %, more preferably 5 to 10 volume %. For purposes of this invention and the claims thereto polymerization medium means the mixture of solvent, unreacted monomers, polymer produced.

In a preferred embodiment, the fluorocarbons are present in the polymerization effluent at 1 to 50 volume %, based upon the volume of the medium, preferably the fluorocarbons are present at 5 to 40 volume %, preferably 5 to 30 volume %, more preferably at 10 to 30 volume %, more preferably 10 to 20 volume %. In a preferred embodiment, the fluorocarbons are present in the polymerization effluent at 0.1 to 20 volume %, based upon the volume of the effluent, preferably the fluorocarbons are present at 1 to 15 volume %, preferably 2 to 15 volume %, more preferably at 5 to 15 volume %. For purposes of this invention and the claims thereto polymerization effluent means the mixture exiting the reactor and all additives added to it until the first flash or solvent removal step.

Fluorocarbons

The polymerization processes of this invention are preferably conducted in the presence of a perfluorocarbon ("PFC" or "PFC's") or a hydrofluorocarbon ("HFC" or "HFC's"), collectively referred to as "fluorinated hydrocarbons" or "fluorocarbons" ("FC" or "FC's"). In another embodiment the polymerization process is conducted without fluorocarbon present and the fluorocarbon is added to the polymerization effluent after the polymerization reaction has stopped. In another embodiment the polymerization process is conducted without fluorocarbon present and the fluorocarbon is added to the polymerization effluent after the polymerization effluent has exited the reactor. In another embodiment the polymerization process is conducted in the presence of fluorocarbon and additional fluorocarbon (which may be the same or different from the first fluorocarbon) is added to the polymerization effluent after the polymerization reaction has exited the reactor and or the polymerization reaction has stopped.

Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Preferred HFC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal 0 and z is an integer and at least one, more preferably, y and z are integers and at least one. In a preferred embodiment z is 2 or more. For purposes of this invention and the claims thereto, the terms hydrofluorocarbon and fluorocarbon do not include chlorofluorocarbons.

In one embodiment, a mixture of fluorocarbons are used in the process of the invention, preferably a mixture of a perfluorinated hydrocarbon and a hydrofluorocarbon, and more preferably a mixture of a hydrofluorocarbons. In another embodiment, the fluorocarbon is not a perfluorinated hydrocarbon. In yet another embodiment, the hydrofluorocarbon is balanced or unbalanced in the number of fluorine atoms in the HFC used.

Non-limiting examples of fluorocarbons useful in this invention include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2, 3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorocarbons described herein, those fluorocarbons described in Raymond Will, et. al., CEH Marketing Report, Fluorocarbons, Pages 1-133, by the Chemical Economics Handbook-SRI International, April 2001, which is fully incorporated herein by reference, are included.

In another preferred embodiment, the fluorocarbon(s) used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mifc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon and preferably the hydrofluorocarbon is present at more than 1 volume %, based upon the total volume of the perfluorocarbon and the hydrofluorocarbon present in the reactor, (with the balance being made up by the perfluorocarbon) preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorocarbons of the invention have a weight average molecular weight (Mw) greater than 30 a.m.u., preferably greater than 35 a.m.u, and more preferably greater than 40 a.m.u. In another embodiment, the fluorocarbons of the invention have a Mw greater than 60 a.m.u, preferably greater than 65 a.m.u, even more preferably greater than 70 a.m.u, and most preferably greater than 80 a.m.u. In still another embodiment, the fluorocarbons of the invention have a Mw greater than 90 a.m.u, preferably greater than 100 a.m.u, even more preferably greater than 135 a.m.u, and most preferably greater than 150 a.m.u. In another embodiment, the fluorocarbons of the invention have a Mw greater than 140 a.m.u, preferably greater than 150 a.m.u, more preferably greater than 180 a.m.u, even more preferably greater than 200 a.m.u, and most preferably greater than 225 a.m.u. In an embodiment, the fluorocarbons of the invention have a Mw in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorocarbons of the invention have normal boiling point in the range of from about −100° C. up to the polymerization temperature, preferably up to about 70° C., preferably up to about 85 to 115° C., preferably the normal boiling point of the fluorocarbons is in the range of from −80° C. to about 90° C., more preferably from about −60° C. to about 85° C., and most preferably from about −50° C. to about 80° C. In an embodiment, the fluorocarbons of the invention have normal boiling point greater than −50° C., preferably greater than −50° C. to less than −10° C. In a further embodiment, the fluorocarbons of the invention have normal boiling point greater than −5° C., preferably greater than −5° C. to less than −20° C. In one embodiment, the fluorocarbons of the invention have normal boiling point greater than 10° C., preferably greater than 10° C. to about 60° C.

In another embodiment, the fluorocarbons of the invention have a liquid density @ 20° C. (g/cc) less than 2 g/cc, preferably less than 1.6, preferably less than 1.5 g/cc, preferably less than 1.45 g/cc, preferably less than 1.40, and most preferably less than 1.20 g/cc.

In one embodiment, the fluorocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the fluorocarbons of the invention have any combination of two or more of the aforementioned Mw, normal boiling point, ΔH Vaporization, and liquid density values and ranges. In a preferred embodiment, the fluorocarbons useful in the process of the invention have a Mw greater than 30 a.m.u, preferably greater than 40 a.m.u, and a liquid density less than 2.00 g/cc, preferably less than 1.8 g/cc. In yet another preferred embodiment, the fluorocarbons useful in the process of the invention have a liquid density less than 1.9 g/cc, preferably less than 1.8 g/cc, and a normal boiling point greater than −100° C., preferably greater than −50° C. up to the polymerization temperature of the process, (such as up to 115° C.), preferably less than 100° C., and more preferably less than 90° C., and most preferably less than 60° C., and optionally a ΔH Vaporization in the range from 120 kj/kg to 400 kj/kg.

In another embodiment the fluorocarbons are used in combination with one or more hydrocarbon solvents. Preferably, the hydrocarbon solvent is an aliphatic or aromatic hydrocarbon fluids. Examples of suitable, preferably inert, solvents include, for example, saturated hydrocarbons containing from 1 to 10, preferably 3 to 8 carbon atoms, such as propane, n-butane, isobutane, n-pentane, isopentane, neopentane, n-hexane, isohexane, cyclohexane and other saturated $C_6$ to $C_8$ hydrocarbons. Preferred hydrocarbon fluids also include desulphurized light virgin naphtha, and alkanes (preferably C1 to C8 alkanes), such as propane, isobutane, mixed butanes, hexane, pentane, isopentane, cyclohexane, isooctane, and octane. Likewise one may also use mixtures of C3 to C20 paraffins and isoparaffins, preferably paraffinic/isoparrifinic mixtures of C4, C5 and or C6 alkanes.

In another embodiment, the FC is selected based upon its solubility or lack thereof in a particular polymer being produced. Preferred fluorocarbons have little to no solubility in the polymer. Solubility in the polymer is measured by forming the polymer into a film of thickness between 50 and 100 microns, then soaking it in fluorocarbon (enough to cover the film) for 4 hours at the relevant desired polymerization temperature and pressure in a sealed container or vessel. The film is removed from the fluorocarbon, exposed for 90 seconds to evaporate excess fluorocarbon from the surface of the film, and weighed. The mass uptake is defined as the percentage increase in the film weight after soaking. The fluorocarbon or fluorocarbon mixture is selected so that the polymer has a mass uptake of less than 4 wt %, preferably less than 3 wt %, more preferably less than 2 wt %, even more preferably less than 1 wt %, and most preferably less than 0.5 wt %.

In a preferred embodiment, the fluorocarbon(s) or mixtures thereof, preferably, the HFC's or mixtures thereof, are selected such that the polymer melting temperature Tm is reduced (or depressed) by not more than 25° C. by the presence of the fluorocarbon, preferably by not more than 20° C., preferably not more than 15° C. The depression of the polymer melting temperature $A^{TM}$ is determined by first measuring the melting temperature of a polymer by differential scanning calorimetry (DSC), and then comparing this to a similar measurement on a sample of the same polymer that has been soaked with the fluorocarbon for four hours. In general, the melting temperature of the soaked polymer will be lower than that of the dry polymer. The difference in these measurements is taken as the melting point depression ΔTm. Higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the fluorocarbon to be evaluated). As described in the reference above, it is important to ensure that the second part of the test, conducted in the presence of the liquid, is done in a sealed container so that the liquid is not flashed during the test, which could introduce experimental error. In one embodiment, the A™ is less than 12° C., preferably less than 10° C., preferably less than 8° C., more preferably less than 6° C., and most preferably less than 4° C. In another embodiment, the measured A™ is less than 5° C., preferably less than 4° C., more preferably less than 3° C., even more preferably less than 2° C., and most preferably less than 1° C.

In a preferred embodiment, the fluorocarbon(s) or mixtures thereof, preferably, the fluorocarbon or mixtures thereof, are selected such that these are miscible to the hydrocarbon solvent and liquid monomers when a mixture is used. By miscible is meant that the FC and the hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

Polymerization Process

For purposes of this invention and the claims thereto, by continuous is meant a system that operates (or is intended to operate) without interruption or cessation. For example a continuous process to produce a polymer would be one where the reactants are continually introduced into one or more reactors and polymer product is continually withdrawn.

In a preferred embodiment any of the polymerization process described herein are a continuous process.

In a preferred embodiment, the catalyst systems described herein are used in a polymerization process to produce olefin polymers, particularly ethylene and or propylene based olefin polymers where the polymer is produced such that it is present as a solute in the polymerization medium or polymerization effluent. Generally this involves polymerization in a continuous reactor in which the polymer formed and the starting monomer and catalyst materials supplied, are agitated to reduce or avoid concentration gradients and in which the monomer acts as diluent or solvent or in which a hydrocarbon is used as a diluent or solvent. Suitable processes typically operate at temperatures from 0 to 350° C., preferably from 10 to 300° C., more preferably from 40 to 250, more preferably 50 to 235° C. and preferably at pressures of 0.1 MPa or more, preferably 2 MPa or more. In another embodiment, the polymerization temperature is above room temperature (23° C.), preferably above 30° C., preferably above 50° C., preferably above 70° C. The upper pressure limit is not critically constrained but typically can be 200 MPa or less, preferably, 120 MPa or less. Temperature control in the reactor is generally obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. Preferably a fluorocarbon is added to the polymerization reactor as a pure component or a mixture with other fluorocarbon and/or hydrocarbon. The type and amount of fluorocarbon in a mixture with hydrocarbon is such that precipitation of polymers produced does not occur when a mixture of fluorocarbon and hydrocarbon is used. The type and amount of fluorocarbon is also preferably optimized for the maximum catalyst productivity for a particular type of polymerization. The fluorocarbon can be also introduced into the reactor as a catalyst carrier. The fluorocarbon can be introduced as a gas phase or as a liquid phase depending on pressure and temperature. Advantageously, the fluorocarbon is kept in a liquid phase and introduced as a liquid. FC can be introduced in the feed to the polymerization reactors or in the polymerization reactor effluent.

In a preferred embodiment, the polymerization process is a steady state, polymerization conducted in a well-mixed continuous feed polymerization reactor or reactors in series or parallel configuration. A preferred process can be described as a continuous, non-batch process that, in its steady state operation, is exemplified by removal of amounts of polymer made per unit time, being substantially equal to the amount of polymer withdrawn from the reaction vessel per unit time. By "substantially equal" is meant that these amounts, polymer made per unit time, and polymer withdrawn per unit time, are in ratios of one to the other, of from 0.9:1; or 0.95:1; or 0.97:1; or 1:1. In such a reactor, there is preferably a substantially homogeneous monomer distribution. At the same time, the polymerization is accomplished in substantially single step or stage or in a single reactor, contrasted to multistage or multiple reactors (two or more). These conditions preferably exist for substantially all of the time the copolymer is produced. In such a process the fluorocarbon is preferably injected into the first reactor feed however the FC may also be injected into the reactor(s) directly In another preferred embodiment, the following procedure is carried out to obtain a copolymer, preferably comprising propylene and ethylene. In a stirred-tank reactor propylene monomer is introduced continuously together with solvent (if any), fluorocarbon and ethylene monomer. The reactor contains a liquid phase composed substantially of fluorocarbon, and ethylene and propylene monomers together with any solvent or additional diluent. If desired, a small amount of a "H"-branch inducing diene such as norbornadiene, 1,7octadiene or 1,9-decadiene may also be added. A transition metal compound and activator are continuously introduced in the reactor liquid phase. The reactor temperature and pressure may be controlled by adjusting the solvent/monomer ratio, the catalyst addition rate, as well as by cooling or heating coils, jackets or both. Preferably the polymerization rate is controlled by the rate of catalyst addition. Typically, the ethylene content of the polymer product can be determined by the ratio of ethylene to propylene in the reactor, which is controlled by manipulating the respective feed rates of these components to the reactor. The polymer product molecular weight is preferably controlled by controlling other polymerization variables such as the temperature, monomer concentration, or by a stream of hydrogen introduced to the reactor, as is known in the art. The reactor effluent is optionally contacted with a catalyst kill agent, such as water. The polymer solution is then optionally heated, and the polymer product is recovered by flashing off unreacted gaseous ethylene and propylene and fluorocarbon as well as residual solvent or diluent at reduced pressure, and, if necessary, conducting farther devolatilization in equipment such as a devolatilizing extruder or other devolatilizing equipment operated at reduced pressure.

For a propylene homo- or co-polymerization process conducted in the presence of hydrocarbon diluent or solvent in addition to the fluorocarbon, especially a continuous polymerization, preferred ranges of propylene concentration at steady state are from about 0.05 weight percent of the total reactor contents to about 50 weight percent of the total reactor contents, more preferably from about 0.5 weight percent of the total reactor contents to about 30 weight percent of the total reactor contents, and most preferably from about 1 weight percent of the total reactor contents to about 25 weight percent of the total reactor contents. The preferred range of polymer concentration (otherwise known as % solids) is from about 3% of the reactor contents by weight to about 45% of the reactor contents or higher, more preferably from about 10% of the reactor contents to about 40% of the reactor contents, and most preferably from about 15% of the reactor contents to about 40% of the reactor contents.

Preferably in a continuous process, the mean residence time of the catalyst and polymer in the reactor generally is from 5 minutes to 8 hours, and preferably from 10 minutes to 6 hours, more preferably from ten minutes to one hour. In some embodiments, comonomer (such as ethylene) is added to the reaction vessel in an amount to maintain a differential pressure in excess of the combined vapor pressure of the main monomer (such as a propylene) and any optional diene monomers present.

In another embodiment, the polymerization process is carried out with a pressure of ethylene of from 10 to 2000 psi (70 to 14000 kPa), most preferably from 40 to 950 psi (275 to 6500 kPa). The polymerization is generally conducted at a temperature of from 25 to 350° C., preferably from 75 to 300° C., and most preferably from greater than 95 to 250° C.

In another preferred embodiment, a process for producing a propylene homopolymer or copolymer of propylene with at least one additional olefinic monomer selected from ethylene or C4 to C20 alpha-olefins comprises the following steps: 1) providing controlled addition of a transition metal compound to a reactor, including an activator and optionally a scavenger component; 2) continuously feeding propylene and optionally one or more additional olefinic monomers independently selected from ethylene or C4 to C20 alpha-olefins into the reactor, optionally with a solvent or diluent, and optionally with a controlled amount of hydrogen; 3) feeding fluorocarbon into the polymerization reactor; and 4) recovering the polymer product. Preferably, the process is a continuous process that may or may not have hydrocarbon solvent or diluent present in the reaction medium. Preferred ranges of ethylene concentration at steady state are from less than about 0.02 weight percent of the total reactor contents to about 5 weight percent of the total reactor contents, and the preferred range of polymer concentration is from about 10% of the reactor contents by weight to about 45% of the reactor contents or higher. The activators and optional scavenger components in the process can be independently mixed with the catalyst component before introduction into the reactor, or they may each independently be fed into the reactor using separate streams, resulting in "in reactor" activation. Scavenger components are known in the art and include, but are not limited to, alkyl aluminum compounds, including alumoxanes. Examples of scavengers include, but are not limited to, trimethyl aluminum, triethyl aluminum, triisobutyl aluminum, trioctyl aluminum, methylalumoxane (MAO), and other alumoxanes including, but not limited to, MMAO3A. MMAO-7, PMAO-IP (all available from Akzo Nobel). Likewise, the fluorocarbons may be introduced into the reactor as a mixture with one or more catalyst system components or a scavenger.

In another preferred embodiment, a process for producing an ethylene homopolymer or copolymer of ethylene with at least one additional olefinic monomer selected from C3 to C20 alpha-olefins comprises the following steps: 1) providing controlled addition of a transition metal compound to a reactor, including an activator and optionally a scavenger component; 2) continuously feeding ethylene and optionally one or more additional olefinic monomers independently selected from C3 to C20 alpha-olefins into the reactor, optionally with a solvent or diluent, and optionally with a controlled amount of hydrogen; 3) feeding fluorocarbon into the polymerization reactor; and 4) recovering the polymer product. Preferably, the process is a continuous process that may or may not have hydrocarbon solvent or diluent present in the reaction medium. Preferred ranges of comonomer concentration at steady state are from less than about 0.02 weight percent of the total reactor contents to about 15 weight percent of the total reactor contents, and the preferred range of polymer concentration is from about 10% of the reactor contents by weight to about 45% of the reactor contents or higher. The activators and optional scavenger components in the process can be independently mixed with the catalyst component before introduction into the reactor, or they may each independently be fed into the reactor using separate streams, resulting in "in reactor" activation. Scavenger components are known in the art and include, but are not limited to, alkyl aluminum compounds, including alumoxanes. Examples of scavengers include, but are not limited to, trimethyl aluminum, triethyl aluminum, triisobutyl aluminum, trioctyl aluminum, methylalumoxane (MAO), and other alumoxanes including, but not limited to, MMAO3A. MMAO-7, PMAO-IP (all available from Akzo Nobel). Likewise, the fluorocarbons may be introduced into the reactor as a mixture with one or more catalyst system components or a scavenger.

The processes described herein can be carried out in a continuous stirred tank reactor, batch reactor, or plug flow reactor, or more than one reactor operated in series or parallel. These reactors may have or may not have internal cooling and the monomer feed may or may not be refrigerated. See the general disclosure of U.S. Pat. No. 5,001,205 for general process conditions. See also, international application WO 96/33227 and WO 97/22639. As previously noted, the processes described above may optionally use more than one reactor. The use of a second reactor is especially useful in those embodiments in which an additional catalyst, especially a Ziegler-Natta or chrome catalyst, or by proper selection of process conditions, including catalyst selection, polymers with tailored properties can be produced. The cocatalysts and optional scavenger components in the process can be independently mixed with the catalyst component before introduction into the reactor, or they may each independently be fed into the reactor using separate streams, resulting in "in reactor" activation. Likewise, the fluorocarbons may be introduced into the reactor as a mixture with one or more catalyst system components or a scavenger. Each of the above processes may be employed in single reactor, parallel or series reactor configurations. In series operation, the second reactor temperature is preferably higher than the first reactor temperature. In parallel reactor operation, the temperatures of the two reactors are independent. The pressure can vary from about 1 mm Hg to 2500 bar (250 MPa), preferably from 1 bar to 1600 bar (0.1-160 MPa), most preferably from 1 to 500 bar (0.1-50 MPa). The liquid processes comprise contacting olefin monomers with the above described catalyst system in a suitable diluent or solvent and allowing said monomers to react for a sufficient time to produce the desired polymers. In multiple reactor processes the fluorocarbon may be introduced into one or all of the reactors. In particular, a fluorocarbon can be introduced into the first reactor, and a second fluorocarbon (which may be the same or different from the first fluorocarbon) may be introduced into the second reactor. Likewise the fluorocarbon may be introduced in the first reactor alone or the second reactor alone. In addition to the above, in multiple reactor configurations where there is a third, fourth or fifth reactor, the fluorocarbon may be introduced into all of the third, fourth and fifth reactors, none of the third, fourth and fifth reactors, just the third reactor, just the fourth reactor, just the fifth reactor, just the third and fourth reactors, just the third and fifth reactors, or just the fourth and fifth reactors.

Hydrocarbon fluids are suitable for use in the polymerizations of this invention as reaction medium or parts of reaction medium. Preferred hydrocarbon fluids include both aliphatic and aromatic fluids, such as desulphurized light virgin naphtha, and alkanes, such as propane, isobutane, mixed butanes, hexane, pentane, isopentane, isooctane, cyclohexane, isooctane and octane. Likewise one may also use mixtures of C3 to C20 paraffins and isoparaffins, preferably paraffinic/isoparrifinic mixtures of C4, C5 and or C6 alkanes.

In a preferred embodiment, a continuous solution polymerization is used to produce copolymers of propylene and butene and or hexene. The copolymer may also optionally contain diene and or up to 10 weight % ethylene. The polymerization process utilizes two or more metallocene catalysts as described below, preferably, dimethylsilyl tetramethylcyclopentadienyl dodecylamide titanium dimethyl, rac-dimethylsilyl bis(2-methyl-4-phenyl indenyl)zirconium dimethyl, 1,1'-bis(4-triethylsilylphenyl)methylene-(cyclopentadienyl) (2,7-di-tertiary-butyl-9-fluorenyl)hafnium dimethyl, and or dimethylsilylbis(indenyl)hafnium dimethyl; combined with dimethylaniliniumtetrakis-(perfluorophenyl)borate as an activator. An organoaluminum compound, namely, tri-n-octylaluminum, tri-isobutyl aluminum and or triethyl aluminum is preferably added as a scavenger to the monomer feedstreams prior to introduction into the polymerization process. The solution polymerization is conducted in a single, or optionally in two, continuous stirred tank reactors connected in series with hexane, pentane or Isoparm used as the solvent. The reactors may be operated adiabatically or with a cooling loop. In addition, toluene may be added to increase the solubility of the co-catalyst. The catalysts in hexane and the activator in toluene are introduced into the reactor or are introduced into the feed line and are mixed in line for a short time prior to being fed into the reactor. The feed is transferred to the first reactor where the exothermic polymerization reaction is conducted adiabatically or with a coolant loop at a reaction temperature between about 50° C. to about 220° C. The coolant loop, if present is, typically kept at a temperature within 20° C. below the reactor temperature. Hydrogen gas may also be added to the reactors as a further molecular weight regulator. Scavenger (such as trimethylaluminum, triethylaluminum, triisobutylaluminum, tri-n-hexylaluminum, tri-n-octylaluminum) may be used if desired. If desired, polymer product is then transferred to a second reactor, which is also operated adiabatically or with a coolant loop at a temperature between about 50° C. to 200° C. Additional monomers, solvent, catalyst, and activators can be fed to the second reactor. The polymer content leaving the reactor(s) is typically from 8 to 50 weight percent. A heat exchanger then heats the polymer solution to a temperature of about 220° C. The polymer solution enters a low pressure separator vessel which operates at a temperature of about 200-230° C. and a pressure of 0-10 bar (1000 kPa) and flashes the polymer solution to remove volatiles and to increase the polymer content to about 76 to about 98 wt. %. The polymer rich solution is then quenched with water, a low boiling alcohol or another oxygenated hydrocarbon such as a fatty acid (such as stearic acid, or a metal salt thereof). The volatiles from the flash vessel may then be recirculated to the reactor(s). A gear pump at the bottom of the flash vessel drives the polymer rich solution to a flash devolatilizer. An gear pump is coupled to the end of the flash devolatizer whereby the molten polymer material is transferred to a static mixer where additives (e.g. 0-20 wt % tackifier, 0-20 wt % oil, 0-20 wt % LMWiPP, 0.1 to 10 wt % antioxidant, 0 to 10 wt % stabilizer, 0-10 wt % wax, 0-10 wt % maleated PP wax) are combined with the molten polymer. Then the molten polymer may be fed to underwater pelletizer where is cut into pellets, or the molten polymer may be packaged in drum containers. A spin dryer dries the polymer pellets which have a final solvent content of less than about 0.5 wt. %. Preferably a controlled volume of FC component (s) is mixed with the hydrocarbon solvent and monomers in the feed preparation section before injection into the reactors. The range of FC's used is guided by a combination of:

a) The boiling point of the FC is preferably higher than ethylene and propylene so that the FC will co-condense and recycle with the hydrocarbon solvent, if any (typically hexanes), preferably the boiling point is in the range of from 0 to 70° C.; and or b) The extent of fluorination of the FC's is such that they form a single phase with the hydrocarbon solvent (preferably hexane) but are present in a controlled quantity to avoid polymer precipitation in the polymerization reactors, reactor effluent preheater and first flash vessel at operating conditions. Their impact on polymer solvation and hydrodynamic volume is such that the viscosity of an FC modified solution is lower than that without FC for the same polymer molecular weight and concentration.

In another preferred embodiment, a continuous solution polymerization process is used to produce copolymers of ethylene/octene or ethylene/propylene or terpolymers of ethylene/propylene/diene, preferably polymers of propylene and from 0.5 to 20 weight % ethylene. For plastomers and elastomers the polymerization process preferably utilizes a metallocene catalyst, namely, 1,1'-bis(4-triethylsilylphenyl)methylene-(cyclopentadienyl)(2,7-di-tertiary-butyl-9-fluorenyl)hafnium dimethyl with dimethylaniliniumtetrakis (pentafluorophenyl) borate as an activator. An organoaluminum compound, namely, tri-n-octylaluminum, may be added as a scavenger to the monomer feed streams prior to introduction into the polymerization process. For production of more crystalline polymers, dimethylsilylbis (indenyl)hafnium dimethyl is used in combination with dimethylaniliniumtetrakis(pentafluorophenyl) borate. Preferably the solution polymerization is conducted in a single, or optionally in two, continuous stirred tank reactors connected in series with hexane used as the solvent. In addition, toluene may be added to increase the solubility of the co-catalyst. The feed is transferred to the first reactor where the exothermic polymerization reaction is conducted adiabatically at a reaction temperature between about 50° C. to about 220° C. Hydrogen gas may also be added to the reactors as a further molecular weight regulator. If desired, polymer product is then transferred to the second reactor, which is also operated adiabatically at a temperature between about 50° C. to 200° C. Additional monomers, solvent, metallocene catalyst, and activators can be fed to the second reactor. The polymer content leaving the second reactor is preferably from 8 to 22 weight percent. A heat exchanger then heats the polymer solution to a temperature of about 220° C. The polymer solution is then brought to a Lower Critical Solution Temperature (LCST) liquid-liquid phase separator which causes the polymer solution to separate into two liquid phases—an upper lean phase and a lower polymer-rich phase. The upper lean phase contains about 70 wt. % of the solvent and the lower polymer rich phase contains about 30 Wt. % polymer. The polymer solution then enters a low pressure separator vessel which operates at a temperature of about 150° C. and a pressure of 4-10 barg (400 to 1000 kPa) and flashes the lower polymer rich phase to remove volatiles and to increase the polymer content to about 76 wt %, preferably up to about 90 weight %. A gear pump at the bottom of the flash vessel drives the polymer rich solution to a LIST devolatilizer. An extruder is coupled to the end of the LIST devolatizer whereby the polymer material is transferred to a gear pump which pushes the polymer material through a screen pack. Then the polymer is cut into pellets and fed to a water bath. A spin dryer dries the polymer pellets which have a final solvent content of less than about 0.5 wt %. Preferably a controlled volume of FC component(s) is mixed with the hydrocarbon solvent (hexane) and monomers in the feed preparation section before injection into the reactors. The range of FC's used is guided by a combination of:

a) The boiling point of the FC is preferably higher than ethylene and propylene so that the FC will co-condense and recycle with the hydrocarbon solvent, if any (typically hexanes), preferably the boiling point is in the range of from 0 to 70° C. In addition the FC's, preferably have an anti-solvent effect (particularly for those fed into the effluent), lower the critical solution phase cloud point curve making for more efficient separation in the liquid-liquid separator. The FC's preferably separate with the hydrocarbon solvent in the polymer lean phase. Use of these FC's could result in the operation of this critical solution separator at milder conditions of temperature and pressure; and/or b) The extent of fluorination of the FC's is such that they form a single phase with the hexane solvent but are present in a controlled quantity to avoid polymer precipitation in the polymerization reactors at operating conditions. Their impact on polymer solvation and hydrodynamic volume is such that the viscosity of an HFC modified solution is lower than that without BFC for the same polymer molecular weight and concentration.

In another embodiment, EPDM polymers are produced in stirred flow reactors of either one or more stage, preferably in a one-stage reaction system in which a monomer mixture of ethylene, higher alpha-olefin and diene is fed into a reaction vessel along with a Ziegler-Natta catalyst, a cocatalyst and aromatic hydrocarbon solvent. In conventional multi-stage reactions, the ethylene, higher alpha-olefin and non-conjugated diene are added to each reactor to maintain a relatively uniform composition of the terpolymer. One such multi-stage method is disclosed in U.S. Pat. No. 3,629,212. In a preferred embodiment, a terpolymer is prepared by (1) adding to a first reactor solvent, from about 50 to 90 percent by weight of the total ethylene charge, from about 30 to 100 percent by weight of the total higher alpha-olefin charge, from about 30 to 100 percent by weight of the total Ziegler-Natta catalyst charge, from about 30 to 100 percent by weight of the total organoaluminum cocatalyst charge and non-conjugated diene, (2) partially polymerizing a portion of the ethylene, higher alpha-olefin and diene in that first reactor to form a polymer cement (polymer dissolved in the solvent); (3) passing the reactor contents including the polymer cement from the first reactor to a second reactor connected in series with the first reactor; (4) adding ethylene to the second reactor along with an amount of non-conjugated diene such that the resultant polymerized weight percent diene content of the polymer from the first reactor is at least about 10 percent greater, on a relative basis, than the resultant polymerized weight percent diene content of the polymer from the second reactor; and (5) further polymerizing the ethylene, higher alpha-olefin and non-conjugated diene in the second reactor. From about 50 to about 100 percent by weight of the total non-conjugated diene charge is added to the first reactor, preferably from about 80 to about 100 percent and most preferably, all of the non-conjugated diene charge is fed only into the first reactor. (For example, where the resultant non-conjugated diene content in the polymer from the first reactor would be 6% and that from the second reactor 5%, the relative difference in diene content of the two polymers is at least 10%; in this example it is 20% greater.) Typically, after the desired polymerization has been completed the contents of the second or subsequent reactor is discharged, the polymerization reaction of the discharged contents is terminated, and the terpolymer is collected and finished. In another suitable arrangement, the reaction zones may be within a single reactor with horizontal baffles dividing the reactor into two or more distinct zones for polymerization. In such an arrangement, separate feed inlets are provided for each reaction zone. The same sequence of adding solvent, monomers, catalyst and cocatalyst is provided in each zone, as in the case of two separate reactors. Thus, in a two-stage reactor system such as the one shown in U.S. Pat. No. 4,016,342, the process of the present invention can be performed by continuously feeding ethylene, C3 or higher alpha-olefin, non-conjugated diene, solvent, catalyst and cocatalyst into the first stirred reactor. Without quenching or otherwise deactivating the catalyst components, except through attrition within the first reactor, the polymer cement is fed directly from the first reactor to the second reactor. Additional ethylene is fed continuously into the second reactor. Preferably, C3 or higher alpha-olefin is also fed continuously into the second reactor. Some non-conjugated diene can also be added to the second or subsequent reactor in an amount such that the resulting polymerized weight percent diene content of the terpolymer from the first or preceding reactor is at least about 10 percent greater, on a relative basis, than the resulting polymerized weight percent diene content of the polymer from the second or following reactor. The monomers are thus further polymerized in the second reactor. Hydrogen, or other chain transfer agents, may also be optionally fed to one or more reactors to control polymer molecular weight. Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to Cg saturated alicyclic or aromatic hydrocarbons or $C_2$ to $C_6$ halogenated hydrocarbons. Most preferred are $C_{12}$ or lower, straight 11 chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. These processes are carried out in a mix-free reactor system (such as a plug flow reactor system), which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention. The desired polymer can be obtained if additional solvent and reactants (e.g., at least one of the ethylene, alpha-olefin and diene) are added either along the length of a tubular reactor or during the course of polymerization in a batch reactor. Operating in this fashion may be desirable in certain circumstances to control the polymerization rate or polymer composition. However, it is necessary to add essentially all of the catalyst at the inlet of the tube or at the onset of batch reactor operation to meet the requirement that essentially all polymer chains are initiated simultaneously. If adiabatic reactor operation is used, the inlet temperature of the reactor feed could be about from −50° C. to 150° C. It is believed that the outlet temperature of the reaction mixture could be as high as about 200° C. The preferred maximum outlet temperature is about 70° C. The most preferred maximum is about 50° C. In the absence of reactor cooling, such as by a cooling jacket, to remove the heat of polymerization, it has been determined that the temperature of the reaction mixture will increase from reactor inlet to outlet by about 13° C. per weight percent of copolymer in the reaction mixture (weight of copolymer per weight of solvent). The residence time of the reaction mixture in the mix-free reactor (such as a plug flow reactor) can vary over a wide range from as low as about 1 second to as high as 3600 seconds. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds. Choice of reactor temperature is dependent upon the effect of temperature on catalyst deactivation rate. Temperatures should not exceed the point at which the concentration of catalyst in the second reactor is insufficient to make the desired polymer component in the desired amount. This temperature will be a function of the details of the catalyst system. In general, the first reactor temperature can vary between 0-110° C. with 10-90° C. preferred and 20-70° C. most preferred. Second reactor temperatures will vary from 40-140° C., with 50-120° C. preferred and 60-110° C. most preferred. The reactors may be cooled by reactor jackets, cooling coils, auto refrigeration, pre-chilled feeds or combinations of these. Adiabatic reactors with pre-chilled feeds are preferred. This gives rise to a temperature difference between reactors which is helpful for controlling polymer molecular weight. Residence time is the same or different in each reactor stage as set by reactor volumes and flow rates. Residence time is defined as the average length of time reactants spend within a process vessel. The total residence time, i.e. the total time spent in all reactors is preferably 2-90 minutes and more preferably 540 minutes. Polymer composition is controlled by the amount of monomers fed to each reactor of the train. In a two reactor series unreacted monomers from the first reactor flow into the second reactor and so the monomers added to the second reactor are just enough to adjust the composition of the feed to the desired level, taking into account the monomer carry over. Depending on reaction conditions in the first reactor (catalyst concentration, temperature, monomer feed rates, etc.) a monomer may be in excess in the reactor outlet relative to the amount required to make a certain composition in the second reactor. Since it is not economically feasible to remove a monomer from the reaction mixture, situations like this should be avoided by adjusting reaction conditions. The polymer product can be recovered from solution at the completion of the polymerization by any of the techniques well known in the art such as steam stripping followed by extrusion drying or by devolatilizing extrusion. Polymer molecular weight is controlled by reactor temperature, monomer concentration, and by the addition of chain transfer agents such as hydrogen. With metallocene catalysts, polymer molecular weight usually declines as reaction temperature increases and as the ethylene content of the polymer decreases. Adiabatic reactor operation in a two reactor series produces a higher temperature in the second reactor than the first making it easier to make the low molecular weight component in the second reactor. Molecular weight in the second reactor can be further reduced and MWD broadened by adding hydrogen to the second reactor. Hydrogen can also be added to the first reactor but because unreacted hydrogen will carry over to the second reactor the molecular weight of both polymer components will be decreased in this situation and the effect of hydrogen on MWD will be much less. Preferably a controlled volume of FC components is mixed with the hydrocarbon solvent and monomers in the feed preparation section before injection into the reactors. The range of FC's used is guided by a combination of:

a) The boiling point of the FC is preferably higher than ethylene and propylene so that the FC will co-condense and recycle with the recovered hydrocarbon solvent, if any (typically hexanes) in the hexane purification tower, preferably the boiling point is in the range of from 0 to 70° C., b) The extent of fluorination of the FC's is such that they form a single phase with the hexane solvent but are present in a controlled quantity to avoid polymer precipitation in the polymerization reactors, reactor effluent preheater and first flash vessel at operating conditions. Their impact on polymer solvation and hydrodynamic volume is such that the viscosity of an FC modified solution is lower than that without FC for the same polymer molecular weight and concentration.

In another embodiment, ethylene polymers and copolymers (preferably ethylene octene copolymers) are produced in a solution process at a pressure of 2.5 to 7.0, preferably 3.0 to 6.2 MPa, a temperature of 130 to 300° C., preferably 170 to 250° C., in a hydrocarbon solvent, preferably an isoparaffin solvent, such as ISOPAR E™ (which is an isoparaffin solvent having a pour point of −63° C., a distillation range of 117-136° C., a specific gravity of 0.72, a viscosity of 0.85 cSt at 25° C., and less than 0.01 weight % aromatics, available from ExxonMobil Chemical Company, in Houston, Tex.). In a particularly preferred embodiment, monomer (such as recycled or fresh ethylene compressed to 2.6 to 7.0 MPa) is mixed with fresh comonomer, fresh solvent and any recycle solvent-comonomer blend. The total stream is cooled to about −150 to 50° C., preferably to about 10-20° C., and transferred to a polymerization reactor(s) via a feed pump (the feed is preferably cooled to help maintain a reactor outlet temperature of about 220 to 240° C. Single or multiple reactors in series may be used. If multiple reactors are used, it provides the opportunity for better control of heat removal and tailoring of product properties such as molecular weight, and molecular weight distribution and allows higher conversion for higher molecular weight products. The system is preferably operated at low residence times, such as 3 to 20 minutes, preferably 5 to 12 minutes. Typically the system operates at 15 to 28% polymer in the solution, influenced principally by product melt index requirements and the impact on solution viscosity/mixing. Once removed from the reactor the melt solution is typically heated and devolatilized in a first flash drum at 0.1 to 0.5 MPa. The residual polymer with some solvent, fluorocarbon and comonomer may be further heated and transferred to a vacuum flash drum or vacuum falling strand evaporator for removal of residual volatiles operating at vacuum down to 20 mm Hg. The polymer melt from this vacuum vessel is finished in a static mixer or melt extruder to yield pellets. In a preferred embodiment, ethylene polymers having densities up to 0.965 g/cc and ethylene octene copolymers below 0.940 g/cc density are produced by this process. Preferably a controlled volume of FC components is mixed with the hydrocarbon solvent and monomers in the feed preparation section before injection into the reactors. The range of FC's used is guided by a combination of:

a) The boiling point of the FC is preferably higher than ethylene and thus are preferably co-condensed with the hydrocarbon solvent and unreacted comonomer (octene) in the overhead of the recycle wax separation stripper tower but preferably the boiling point of the FC is lower than octane/octene so that no residual FC remains in the finished polymer product pellets; and or b) The extent of fluorination of the FC's is such that they form a single phase with the isooctane solvent but are present in a controlled quantity to avoid polymer precipitation in the polymerization reactors and first flash vessel at operating conditions. Their impact on polymer solvation and hydrodynamic volume is such that the viscosity of an FC modified solution is lower than that without FC for the same polymer molecular weight and concentration.

In another embodiment, ethylene polymers and copolymers (preferably ethylene octene copolymers) are produced in a solution process at a pressure of 4.0 to 7.0, preferably 4.5 to 6.3 MPa, a temperature of 120 to 300° C., preferably 125 to 235° C., in a hydrocarbon solvent, preferably an isoparaffin solvent, such as ISOPAR E™ (which is an isoparaffin solvent having a pour point of −63° C., a distillation range of 117-136° C., a specific gravity of 0.72, a viscosity of 0.85 cSt at 25° C., and less than 0.01 weight % aromatics, available from ExxonMobil Chemical Company, in Houston, Tex.). In a particularly preferred embodiment, monomer (such as recycled or fresh ethylene compressed to 4.6 to 7.0 MPa) is mixed with fresh comonomer, fresh solvent and any recycle solvent-comonomer blend. The total stream is cooled to about −150 to 50° C., preferably to about 10-20° C., and transferred to a polymerization reactor(s) via a feed pump. These reactors are of a loop design fitted with one or two heat exchangers cooled by tempered water to avoid crystallization deposition on the exchanger surface. A single loop reactor or 2 loop reactors arranged either in series or parallel may be used. If multiple reactors are used, it provides the opportunity for better control of heat removal and tailoring of product properties such as molecular weight, and molecular weight distribution. Fresh monomer, comonomer additional catalyst or another catalyst may be injected in the second reactor when in series operation. In parallel operation the conditions and even catalyst types may differ between the two reactors. Both reactor effluent solutions are combined before flashing and polymer recovery to allow efficient mixing of differing polymer structures. The system is preferably operated at low residence times, such as 3 to 20 minutes, preferably 5 to 12 minutes. Typically the system operates at 15 to 28% polymer in the solution, influenced principally by product melt index requirements and the impact on solution viscosity/mixing. Once removed from the reactor the melt solution (effluent) is typically heated and devolatilized in a first flash drum at 0.1 to 0.5 MPa. The residual polymer with some solvent, fluorocarbon and comonomer may be further heated and transferred to a vacuum flash drum or vacuum falling strand evaporator for removal of residual volatiles operating at vacuum down to 20 nm im Hg. The polymer melt from this vacuum vessel is finished in a static mixer or melt extruder to yield pellets. Preferably a controlled volume of FC components is mixed with the hydrocarbon solvent and monomers in the feed preparation section before injection into the reactors. The range of FC's used is guided by a combination of:

a) The boiling point of the FC is preferably is higher than ethylene such that the FC's are co-condensed with the hydrocarbon solvent and unreacted comonomer (octene) in the overhead of the recycle wax separation stripper tower but lower than octane/octene so that no residual FC remains in the finished polymer product pellets; and/or b) The extent of fluorination of the FC's is such that they form a single phase with the isooctane solvent but are present in a controlled quantity to avoid polymer precipitation in the polymerization reactors and first flash vessel at operating conditions. Their impact on polymer solvation and hydrodynamic volume is such that the viscosity of an FC modified solution is lower than that without FC for the same polymer molecular weight and concentration. In a preferred embodiment, ethylene polymers having densities up to 0.965 g/cc and ethylene octene copolymers below 0.940 g/cc down to 0.865 cc/g density are produced by this process.

In another embodiment, ethylene with one or more olefins (C3 to C20) are mixed with a paraffinic solvent such as Isopar E and cooled to −40 to 0° C. Catalyst components are injected as solutions either directly into the reactor or just before the reaction zone. The polymerization is carried out in one or more reactors in series operating at pressures up to 100 MPa and temperatures in the range 40 to 140° C. These reactors may be continuous stirred tanks or loop type with the ability for heat removal through the reactor wall or via a heat exchanger in the reactor loop. The polymer solution is continuously removed, heated to 150-240° C. before entering a low pressure flash vessel at 0.1 to 0.5 MPa. The volatile materials are condensed and recycled. The polymer cement is transferred to a vacuum flash system for removal of residual solvent, monomers and waxes and the resulting polymer melt is finished in a devolatilizing extruder. During the transfer to the second flash stage a catalyst killer such as water, a low boiling alcohol or carboxylic acid is injected at levels sufficient to kill all remaining catalytic activity. Preferably a controlled volume of FC components is mixed with the hydrocarbon solvent and monomers in the feed preparation section before injection into the reactors. The range of FC's used is guided by a combination of:

a) The boiling point of the FC is preferably higher than ethylene such that the FC's are co-condensed with the hydrocarbon solvent and unreacted comonomer (octene) in the overhead of the recycle wax separation stripper tower but lower than octane/octene so that no residual FC remains in the finished polymer product pellets; and or b) The extent of fluorination of the FC's is such that they form a single phase with the isooctane solvent but are present in a controlled quantity to avoid polymer precipitation in the polymerization reactors and first flash vessel at operating conditions. Their impact on polymer solvation and hydrodynamic volume is such that the viscosity of an FC modified solution is lower than that without FC for the same polymer molecular weight and concentration.

In another embodiment, polymerization of ethylene and an alpha olefin such as octene-1 is carried out in a single agitated liquid filled vessel under adiabatic conditions at a temperature between 150 and 250° C., and a pressure of 450 and 1400 psi (3.1 to 9.7 MPa) with a hydrocarbon solvent such as mixed hexane or desulphurized light virgin naphtha present at a residence time of 20 minutes or less, preferably 10 minutes or less. This reactor effluent is heated and depressurized to 0.1 to 0.5 MPa in a flash vessel where unreacted ethylene and most solvent and comonomer exits as vapor for recovery and recycle. A solution of stabilizers in isopropanol is injected into the polymer melt to kill the catalyst. This mixture is then pumped to either a devolatilizing twin screw extruder operating at 20 mm Hg or passes a falling strand vacuum evaporator before being finished in a melt extruder. Both finishing methods remove residual comonomer, solvent and some waxy product. Solvent, unreacted monomers and waxy side products are condensed and the liquid is water washed to remove isopropanol and stripped to separate waxy materials. The hydrocarbons are dried and purified over fixed bed adsorbents before recycling to the feed preparation drum. This process preferably is used to produce homopolymers of ethylene and copolymers of ethylene and butene, pentene, hexene, heptene and or octene, preferably butene, hexene and or octene, having densities from 0.880 to 0.965 g/cc, preferably from 0.900 to 0.965 g/cc and melt indices of 0.5 to 100 dg/min (ASTM 1238, condition E). Preferably a controlled volume of FC components is mixed with the hydrocarbon solvent and monomers in the feed preparation section before injection into the reactors. The range of FC's used is guided by a combination of:

a) The boiling point of the FC is preferably higher than ethylene (preferably in the range of from 0 to 70° C.) so that the FC and the monomers co-condense and recycle with the hydrocarbon solvent (hexanes); and/or b) The extent of fluorination of the HFC's is such that they form a single phase with the hexane solvent but are present in a controlled quantity to avoid polymer precipitation in the polymerization reactors, reactor effluent preheater and first flash vessel at operating conditions. Their impact on polymer solvation and hydrodynamic volume is such that the viscosity of an FC modified solution is lower than that without FC for the same polymer molecular weight and concentration.

In another embodiment, polymerization is carried out in a single or in multiple reactors at a temperature up to 300° C. and pressures up to 2000 psi (13.6 MPa) using a hydrocarbon solvent such as cyclohexane where the feed stream does not have to be refrigerated, the residence times are 10 minutes or less, preferably 5 minutes or less, more preferably 2 minutes or less to produce ethylene homopolymers and copolymers of ethylene and butene and or hexene. The reactors may be stirred tank, tubular or a combination thereof. Generally the ethylene is mixed with solvent and comonomer, pressurized and fed into the reactor along with the catalyst. After polymerization a catalyst deactivator may be added to the solution stream to deactivate the catalyst. The deactivator and or deactivated catalyst may then be removed down stream (by alumina beds, for example). Then the molten polymer stream is depressurized where solvent and monomer are flashed off. Steam stripping of the final polymer melt may be carried out to remove waxes and any residual solvent and comonomers before finishing with a melt extruder/pelletizer. In a preferred embodiment, multiple reactors, particularly a stirred tank in series with a tube, are used. Preferably a controlled volume of FC components is mixed with the hydrocarbon solvent and monomers in the feed preparation section before injection into the reactors. The range of FC's used is guided by a combination of:

a) The boiling point of the PC is preferably higher than ethylene (preferably in the range of from 0 to 70° C.) so that the FC and the monomers co-condense and recycle with the hydrocarbon solvent (cyclohexane); and/or b) The extent of fluorination of the FC's is such that they form a single phase with the cyclohexane solvent but are present in a controlled quantity to avoid polymer precipitation in the polymerization reactors, reactor effluent preheater and first flash vessel at operating conditions. Their impact on polymer solvation and hydrodynamic volume is such that the viscosity of an FC modified solution is lower than that without FC for the same polymer molecular weight and concentration.

Alternatively, two continuous stirred tanks in series operating at pressures up to 180 MPa with a light hydrocarbon paraffinic solvent such as propane, butane, pentane or hexane may be used with the possibility to inject additional monomer, comonomer and catalyst into the second reactor. The reactor effluent is heated, flashed first at low pressures, below 0.5 MPa and then at vacuum before finishing in an extruder. In such an embodiment, preferably a controlled volume of FC components is mixed with the hydrocarbon solvent and monomers in the feed preparation section before injection into the reactors. The range of FC's used is guided by a combination of:

a) The boiling point of the FC is higher than ethylene so the FC's are not lost with any process degassing and the FC's should boil with the process solvent (i.e. have a boiling point lower than the solvent) to minimize loss into the polymer product; and or b) The extent of fluorination of the FC's is such that they form a single phase with the isooctane solvent but are present in a controlled quantity to avoid polymer precipitation in the polymerization reactors and first flash vessel at operating conditions. Their impact on polymer solvation and hydrodynamic volume is such that the viscosity of an FC modified solution is lower than that without FC for the same polymer molecular weight and concentration.

In another embodiment, the effluent containing the FC is split into streams, including a hydrocarbon streams, and or waste stream and activated carbon is used to remove the fluorocarbon(s) from the hydrocarbon streams and/or the waste streams. When using fluorocarbons in a process (such as a polymerization process or polymer recovery method) it is useful to prevent the escape of the fluorocarbons to the atmosphere. It is also useful to prevent the passage of fluorocarbons to the flare or other combustion process. Specifically, in some embodiments, activated carbon is used to remove the fluorocarbons from a gas or liquid process stream.

In another embodiment, the activated carbon would be used as the absorbent material in a Pressure Swing Adsorption (PSA) process. A PSA process employs at least two separate adsorption columns. One column operates as the active column, adsorbing material from the flow stream while the other operates off-line (at reduced pressure) in the "regeneration" mode. When the adsorption capacity of the active column is reached, the role of the columns is reversed. The alternating cycles of this process provide an effectively continuous flow path through the system, and a continuous removal of certain components from the flow stream (i.e. those components that are strongly adsorbed by the activated carbon, such as fluorocarbons). In another preferred embodiment, when using the activated carbon for removal of fluorocarbons from a process stream, a PSA system of a given size could operated at a reduced cycle frequency for improved reliability and reduced mechanical wear on the switching valve components as compared to a process stream of hydrocarbons without fluorocarbons. In another preferred embodiment, a PSA system could be designed with smaller sized columns for reduced cost when using the activated carbon for removal of fluorocarbons from a process stream as compared to a process stream of hydrocarbons without fluorocarbon.

In an alternative embodiment, the activated carbon is used as a safety "guard bed" downstream of a primary separation system. The purpose of this guard bed would be to capture any fluorocarbon material that may bypass the primary separation system. In this case, the advantages provided by the activated carbon would be similar to that described above with PSA. The size (and cost) of the guard bed could be reduced significantly.

Catalyst Components and Catalyst Systems

All polymerization catalysts including conventional-type transition metal catalysts are suitable for use in the polymerization process of the invention. The following is a non-limiting discussion of the various polymerization catalysts useful in the process of the invention.

Conventional-Type Transition Metal Catalysts

Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639, 4,077,904 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x \qquad (I)$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.\frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302, 565, 4,302,566 and 5,763,723 and published EP-A2 0 416 815 A2 and EP-A10 420 436, which are all herein incorporated by reference.

The conventional-type transition metal catalysts of the invention may also have the general formula:

$$M'_t M''X_{2t}Y_u E \qquad (II)$$

where M' is Mg, Mn and/or Ca; t is a number from 0.5 to 2; M'' is a transition metal such as Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and 0) phosphorus oxy-chloride. Non-limiting examples of complexes satisfying the above formula include: $MgTiCl_5.2CH_3COOC_2H_5$, $Mg_3Ti_2Cl_{12}.7CH_3COOC_2H_5$, $MgTiCl_5.6C_2H_5OH$, $MgTiCl_5.100CH_3OH$, $MgTiCl_5.$tetrahydrofuran, $MgTi_2Cl_{12}.7C_6H_5CN$, $Mg_3Ti_2Cl_{12}.6C_6H_5COOC_2H_5$, $MgTiCl_6.2CH_3COOC_2H_5$, $MgTiC_6.6C_5H_5N$, $MnTiCl_5.4C_2H_5OH$, $MgTiCl_5(OCH_3).2CH_3COOC_2H_5$, $MgTiCl_5N(C_6H_5)_2.3CH_3COOC_2H_5$, $MgTiBr_2Cl_4.2(C_2H_5)_2O$, $Mg_3V_2Cl_{12}.7CH_3$—$COOC_2H_5$, $MgZrCl_6.4$ tetrahydrofuran. Other catalysts may include cationic catalysts such as $AlCl_3$, and other cobalt and iron catalysts well known in the art.

Typically, these conventional-type transition metal catalyst compounds (excluding some conventional-type chromium catalyst compounds) are activated with one or more of the conventional-type cocatalysts described below.

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

Conventional-Type Cocatalysts

Conventional-type cocatalyst compounds for the above conventional-type transition metal catalyst compounds may be represented by the formula:

$$M^3 M^4_v X^2_c R^3_{b-c} \qquad (III)$$

wherein $M^3$ is a metal from Group 1, 2, 12 and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3_k \quad\quad (IV)$$

where $M^3$ is a Group 1, 2, 12 or 13 metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Groups 1, 2, 12 and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds.

Bulky Ligand Metallocene-Type Catalyst Compounds

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthamide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the catalyst composition of the invention includes one or more bulky ligand metallocene catalyst compounds represented by the formula:

$$L^AL^BMQ_n \quad\quad (V)$$

where M is a metal atom from the Periodic Table of the Elements and may be a Group 3 to 12 metal or from the lanthamide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfinur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula III only one of either $L^A$ or $L^B$ is present.

Independently, each $L^A$ and $L_B$ may be unsubstituted or substituted with a combination of substituent groups R. Nonlimiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the invention may include one or more bulky ligand metallocene catalyst compounds where $L^A$ and $L^B$ of Formula V are bridged to each other by at least one bridging group, A, as represented by:

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\,R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP 664 301 B1).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition of the invention includes one or more bulky ligand metallocene catalyst compounds represented by Formula VII:

where M is a Group 3 to 16 metal atom or a metal selected from the Group of actinides and lanthamides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula VII above, $L^C$, A and J form a fused ring system. In an embodiment, $L^C$ of Formula V is as defined above for LA, A, M and Q of Formula VII are as defined above in Formula V.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the FC preferably is a hydrofluorocarbon. Preferably, when the catalyst system comprises compounds represented by Formula VII, the FC is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998 (now U.S. Pat. No. 6,103,657), which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B 1-0 735 057, all of which are herein fully incorporated by reference. In another embodiment, the catalyst composition of the invention includes one or more bulky ligand metallocene catalyst compounds is represented by Formula VIII:

$$L^D MQ_2(YZ)X_n \qquad (VIII)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, preferably Q is selected from the group consisting of —O—, —NR—, —CR2— and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

The catalyst compositions of the invention may include one or more complexes known as transition metal catalysts based on bidentate ligands containing pyridine or quinoline moieties, such as those described in U.S. Pat. No. 6,103,657, which is herein incorporated by reference.

In one embodiment, these catalyst compounds are represented by the formula:

$$((Z)XA_t(YJ))_q MQ_n \qquad (IX)$$

where M is a metal selected from Group 3 to 13 or lanthamide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.* 1995, 117, 6414-6415 and Johnson, et al., "Copolymerization of Ethylene and Propylene with Functionalized Vinyl Monomers by Palladium(II) Catalysts", *J. Am. Chem. Soc.*, 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

It is also contemplated that in one embodiment, the bulky ligand metallocene-type catalysts of the invention include their structural or optical or enantiomeric isomers (meso and racemic isomers) and mixtures thereof. In another embodiment the bulky ligand metallocene-type compounds useful in the invention may be chiral and/or a bridged bulky ligand metallocene-type catalyst compound.

Mixed Catalysts

It is also within the scope of this invention that the above described bulky ligand metallocene-type catalyst compounds can be combined with one or more of the conventional-type transition metal catalysts compounds with one or more co-catalysts or activators or activation methods described above. For example, see U.S. Pat. Nos. 4,937,299, 4,935,474, 5,281, 679, 5,359,015, 5,470,811, and 5,719,241 all of which are herein fully incorporated herein reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Activator and Activation Methods

The above described polymerization catalyst, particularly bulky ligand metallocene-type catalyst compounds, are typically activated in various ways to yield catalyst compounds having a vacant coordination site that will coordinate, insert, and polymerize olefin(s).

For the purposes of this invention, the term "activator" is defined to be any compound which can activate any one of the catalyst compounds described herein by converting the neutral catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In one embodiment, alumoxane activators are utilized as an activator in the catalyst composition of the invention. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Aluminum Alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459)

or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

"Substituted alkyl" refers to an alkyl as described in which one or more hydrogen atoms of the alkyl is replaced by another group such as a halogen, aryl, substituted aryl, cycloalkyl, substituted cycloalkyl, and combinations thereof. Examples of substituted alkyls include, for example, benzyl, trifluoromethyl and the like.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \quad (X)$$

wherein: L is an neutral Lewis base; H is hydrogen; $(L-H)^+$ is a Bronsted acid; $A^{d-}$ is a non-coordinating anion having the charge d−; and d is an integer from 1 to 3. The cation component, $(L-H)_d^+$ may include Bronsted acids such as protons or protonated Lewis bases or reducible Catalysts capable of protonating or abstracting a moiety, such as an alkyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT publication WO 98/07515 such as tris(2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (XII)$$

wherein: $OX^{e+}$ is a cationic oxidizing agent having a charge of e+; e is an integer from 1 to 3; and $A^-$, and d are as previously defined above. Non-limiting examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that catalyst compounds can be combined one or more activators or activation methods described above. For example, a combination of activators have been described in U.S. Pat. Nos. 5,153,157 and 5,453,410, European publication EP-B10 573 120, and PCT publications WO 94/07928 and WO 95/14044. These documents all discuss the use of an alumoxane and an ionizing activator with a bulky ligand metallocene catalyst compound.

In a preferred embodiment, the catalyst systems of this invention are not present on a support.

A preferred catalyst compound for use in this invention is dimethylsilyl t-butyl-amido tetramethylcyclopentadienyl titanium dichloride, preferably activated with a noncoordinating anion such as dimethylaniliniumtetrakis (pentafluorophenyl) borate.

Monomers

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluormonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997). In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In a preferred embodiment the processes of this invention are used to polymerize any unsaturated monomer or monomers. Preferred monomers include $C_2$ to $C_{100}$ olefins, preferably $C_2$ to $C_{60}$ olefins, preferably $C_2$ to $C_{40}$ olefins preferably $C_2$ to $C_{20}$ olefins, preferably $C_2$ to $C_{12}$ olefins. In some embodiments preferred monomers include linear, branched or cyclic alpha-olefins, preferably $C_2$ to $C_{100}$ alpha-olefins, preferably $C_2$ to $C_{60}$ alpha-olefins, preferably $C_2$ to $C_{40}$ alpha-olefins preferably $C_2$ to $C_{20}$ alpha-olefins, preferably $C_2$ to $C_{12}$ alpha-olefins. Preferred olefin monomers may be one or more of ethylene, propylene, butene, pentene, hexene, heptene, octene, nonene, decene, dodecene, 4-methylpentene-1, 3-methylpentene-1,3,5,5-trimethylhexene-1, and 5-ethylnonene-1.

In another embodiment the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include vinyltoluenes, vinylnaphthalene, allyl benzene, and indene, especially 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, cyclopentadiene, cyclopentene, 4-methylcyclopentene, cyclohexene, 4-methylcyclohexene, cyclobutene, vinyladamantane, norbornene, 5-methylnorbornene, 5-ethylnorbornene, 5-propylnorbornene, 5-butylylnorbornene, 5-pentylnorbornene, 5-hexylnorbornene, 5-heptylnorbornene, 5-octylnorbornene, 5-nonylnorbornene, 5-decylnorbornene, 5-phenylnorbornene, vinylnorbornene, ethylidene norbornene, 5,6-dimethylnorbornene, 5,6-dibutylnorbornene and the like.

Preferred diolefin monomers useful in this invention include any hydrocarbon structure, preferably $C_4$ to $C_{30}$, having at least two unsaturated bonds, wherein at least one, typically two, of the unsaturated bonds are readily incorporated into a polymer by either a stereospecific or a non-stereospecific catalyst(s). It is further preferred that the diolefin monomers be selected from alpha-omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions. Preferred dienes include both cis and trans 1,4-hexadiene. Preferred dienes include both cis and trans 1,4-hexadiene.

Non-limiting examples of preferred polar unsaturated monomers useful in this invention include nitro substituted monomers including 6-nitro-1-hexene; amine substituted monomers including N-methylallylamine, N-allylcyclopentylamine, and N-allyl-hexylamine; ketone substituted monomers including methyl vinyl ketone, ethyl vinyl ketone, and 5-hexen-2-one; aldehyde substituted monomers including acrolein, 2,2-dimethyl-4-pentenal, undecylenic aldehyde, and 2,4-dimethyl-2,6-heptadienal; alcohol substituted monomers including allyl alcohol, 7-octen-1-ol, 7-octene-1,2-diol, 10-undecen-1-ol, 10-undecene-1,2-diol, 2-methyl-3-buten-1-ol; acetal, epoxide and or ether substituted monomers including 4-hex-5-enyl-2,2-dimethyl-[1,3]dioxolane, 2,2-dimethyl-4-non-8-enyl-[1,3]dioxolane, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, 11-methoxyundec-1-ene, and 8-methoxyoct-1-ene; sulfur containing monomers including allyl disulfide; acid and ester substituted monomers including acrylic acid, vinylacetic acid, 4-pentenoic acid, 2,2-dimethyl-4-pentenoic acid, 6-heptenoic acid, trans-2,4-pentadienoic acid, 2,6-heptadienoic acid, methyl acrylate, ethyl acrylate, tert-butyl acrylate, n-butyl acrylate, methacrylic acid, methyl methacrylate, ethyl methacrylate, tert-butyl methacrylate, n-butyl methacrylate, hydroxypropyl acrylate, acetic acid oct-7-enyl ester, non-8-enoic acid methyl ester, acetic acid undec-10-enyl ester, dodec-11-enoic acid methyl ester, propionic acid undec-10-enyl ester, dodec-11-enoic acid ethyl ester, and nonylphenoxypolyetheroxy acrylate; siloxy containing monomers including trimethyloct-7-enyloxy silane, and trimethylundec-10-enyloxy silane, polar functionalized norbornene monomers including 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[$9.5.1^{3,9}.1^{5,15}.1^{7,13}$] octasiloxane, 2-benzoyl-5-norbornene, 2-acetyl-5-norbornene, 7-syn methoxymethyl-5-norbornen-2-one, 5-norbornen-2-ol, and 5-norbornen-2-yloxy-trimethylsilane, and partially fluorinated monomers including nonafluoro-1-hexene, allyl-1,1,2,2,-tetrafluoroethyl ether, 2,2,3,3-tetrafluoro-non-8-enoic acid ethyl ester, 1,1,2,2-tetrafluoro-2-(1,1,2,2-tetrafluoro-oct-7-enyloxy)-ethanesulfonyl fluoride, acrylic acid 2,2,3,3,4,4,5,5,6,6,7,7,8,8,8-pentadecafluoro-octyl ester, and 1,1,2,2-tetrafluoro-2-(1,1,2,2,3,3,4,4-octafluoro-dec-9-enyloxy)-ethanesulfonyl fluoride.

In an embodiment herein, the process described herein is used to produce an oligomer of any of the monomers listed above. Preferred oligomers include oligomers of any $C_2$ to $C_{20}$ olefins, preferably $C_2$ to $C_{12}$ alpha-olefins, most preferably oligomers comprising ethylene, propylene and or butene are prepared. A preferred feedstock for the oligomerization process is the alpha-olefin, ethylene. But other alpha-olefins, including but not limited to propylene and 1-butene, may also be used alone or combined with ethylene. Preferred alpha-olefins include any $C_2$ to $C_{40}$ alpha-olefin, preferably and $C_2$ to $C_{20}$ alpha-olefin, preferably any $C_2$ to $C_{12}$ alpha-olefin, preferably ethylene, propylene, and butene, most preferably ethylene.

Dienes may be used in the processes described herein, preferably alpha-omega-dienes are used alone or in combination with mono-alpha olefins.

In a preferred embodiment the process described herein may be used to produce homopolymers or copolymers. (For the purposes of this invention and the claims thereto a copolymer may comprise two, three, four or more different monomer units.) Preferred polymers produced herein include homopolymers or copolymers of any of the above monomers. In a preferred embodiment the polymer is a homopolymer of any $C_2$ to $C_{12}$ alpha-olefin. Preferably the polymer is a homopolymer of ethylene or a homopolymer of propylene. In another embodiment the polymer is a copolymer comprising ethylene and one or more of any of the monomers listed above. In another embodiment the polymer is a copolymer comprising propylene and one or more of any of the monomers listed above. In another preferred embodiment the homopolymers or copolymers described, additionally comprise one or more diolefin comonomers, preferably one or more $C_4$ to $C_{40}$ diolefins.

In another preferred embodiment the polymer produced herein is a copolymer of ethylene and one or more $C_3$ to $C_{20}$ linear, branched or cyclic monomers, preferably one or more $C_3$ to $C_{12}$ linear, branched or cyclic alpha-olefins. Preferably the polymer produced herein is a copolymer of ethylene and one or more of propylene, butene, pentene, hexene, heptene, octene, nonene, decene, dodecene, 4-methylpentene-1,3-methylpentene-1,3,5,5-trimethylhexene-1, cyclopentene, 4-methylcyclopentene, cyclohexene, and 4-methylcyclohexene.

In another preferred embodiment the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably the polymer produced herein is a copolymer of propylene and one or more of ethylene, butene, pentene, hexene, heptene, octene, nonene, decene, dodecene, 4-methylpentene-1,3-methylpentene-1, and 3,5,5-trimethylhexene-1.

In a preferred embodiment, the polymer produced herein is a homopolymer of norbornene or a copolymer of norbornene and a substituted norbornene, including polar functionalized norbornenes.

In a preferred embodiment the polymers described above further comprise one or more dienes at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the copolymers described herein comprise at least 50 mole % of a first monomer and up to 50 mole % of other monomers.

In another embodiment, the polymer comprises:

a first monomer present at from 40 to 95 mole %, preferably 50 to 90 mole %, preferably 60 to 80 mole %, and a comonomer present at from 5 to 60 mole %, preferably 10 to 40 mole %, more preferably 20 to 40 mole %, and a termonomer present at from 0 to 10 mole %, more preferably from 0.5 to 5 mole %, more preferably 1 to 3 mole %.

In a preferred embodiment the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclopentene, cyclohexene, cyclooctene, hexadiene, cyclohexadiene and the like.

In a preferred embodiment the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, 3,5,5-trimethylhexene-1,3-methylpentene-1,4-methylpentene-1, cyclopentadiene, and cyclohexene.

In a preferred embodiment the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, 3,5,5-trimethylhexene-1,3-methylpentene-1,4-methylpentene-1, cyclopentadiene, and cyclohexene.

Polymer Produced

The polymers produced by the process of the invention can be used in a wide variety of products and end-use applications. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. For higher molecular weight applications the polymers produced herein preferably have Mw's of 50,000 to 1,000,000, preferably 70,000 to 500,000. Additionally, preferred polymers and copolymers produced herein may have a molecular weight distribution (MWD) in the range of $\geq 1$, or $\geq 1.5$ or $\leq 8$, or $\leq 6$ or $\leq 4$.

The polymers produced are preferably homo- and co-polymers of ethylene and propylene and include linear low density polyethylene, elastomers, plastomers, high-density polyethylenes, low density polyethylenes, polypropylene and polypropylene copolymers. Polymers, typically ethylene based copolymers, have a density of 0.97 g/cc or less; density being measured in accordance with ASTM-D-1238.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film, oriented films, and the like.

EXAMPLES

Polymerization for Examples V1 to V5 was carried out in a liquid filled, single-stage continuous reactor. The reactor was a 0.5-liter stainless steel autoclave reactor and was equipped with a stirrer, a water-cooling/steam-heating element with a temperature controller, and a pressure controller. Solvents, monomers such as ethylene and propylene, and comonomers (such as butene and hexene), if present, were first purified by passing through a three-column purification system. The purification system consists of an Oxiclear column (Model # RGP-R1-500 from Labelear) followed by a 5 A and a 3 A molecular sieve columns. Purification columns were regenerated periodically whenever there is evidence of lower activity of polymerization. Both the 3A and 5 Å molecular sieve columns were regenerated in-house under nitrogen at a set temperature of 260° C. and 315° C., respectively. The molecular sieve material was purchased from Aldrich. The Oxiclear column was used as received.

The solvent, monomers and comonomers were fed into a manifold first. Ethylene from in-house supply was delivered as a gas solubilized in the chilled solvent/monomer mixture in the manifold. The mixture of solvent and monomers were then chilled to about -15° C. by passing through a chiller before fed into the reactor through a single tube. All liquid flow rates were measured using Brooks mass flow meters or Micro-Motion Coriolis-type flow meters. Ethylene flow rate was metered through a Brooks mass flow controller.

The catalyst compounds used were rac-dimethylsilylbis indenyl hafnium dimethyl (Catalyst A), dimethylsilyl(tetramethylcyclopentadienyl) (cyclododecylamido)titanium dimethyl (Catalyst C), and [di(p-triethylsilylphenyl)methylene] (cyclopentadienyl) (3,8-di-t-butylfluorenyl)hafnium dimethyl (Catalyst D). All of these were obtained from Albemarle.

The catalysts were preactivated with N,N-dimethylanilinium tetrakis(pentafluorophenyl)borate(obtained from Albemarle) at a molar ratio of 1:1 to 1:1.1 in 700 ml of toluene for at least 10 minutes prior to the polymerization reaction. All catalyst solutions were kept in an inert atmosphere with <1.5 ppm water content and fed into reactor by metering pumps.

The contact of catalyst, solvent, fluorocarbon, and monomers took place in the reactor. Catalyst pumps were calibrated periodically using toluene as the calibrating medium. Catalyst concentration in the feed was controlled through changing the catalyst concentration in catalyst solution and/or changing in the feed rate of catalyst solution. The feed rate of catalyst solution varied in a range of 0.2 to 5 ml/minute.

As an impurity scavenger, 250 ml of tri-n-octylaluminum (TNOA) (25 wt. % in toluene, Akzo Noble) was diluted in 22.83 kilogram of hexane. The diluted TNOA solution was stored in a 37.9-liter cylinder under nitrogen blanket. The solution was used for all polymerization runs until about 90% of consumption, and then a new batch was prepared. Feed rates of the tri-n-octylaluminum (TNOA) solution varied from polymerization reaction to reaction, ranging from 0 (no scavenger) to 4 ml per minutes in order to optimize the overall catalyst efficiency.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers, fluorocarbon, and catalyst solutions were then fed into the reactor. An automatic temperature control system was used to control and maintain the reactor at a set temperature. Onset of polymerization activity was determined by observations of a viscous product and lower temperature of water-steam mixture. Once the activity was established and system reached steady state, the reactor was lined out by continuing to operate the system under the established conditions for a time period of at least five times of mean residence time prior to sample collection. The resulting mixture, containing mostly solvent/fluorocarbon, polymer and unreacted monomers, was collected in a collection box. The collected samples were first air-dried in a hood to evaporate most of the solvent/fluorocarbon, and then dried in a vacuum oven at a temperature of about 90° C. for about 12 hours. The vacuum oven dried samples were weighed to obtain yields. All the reactions were carried out at a pressure of 2.41 MPa-g. All the polymers were dissolved in the solvent in the effluent. The detailed reaction conditions are listed in Table E1.

cron particle size). The oven temperature was at 160° C. with the autosampler hot zone at 160° C. and the warm zone at 145° C. About 0.2 wt. % of polymer sample was dissolved in 1,2,4-trichlorobenzene containing 200 ppm 2,6-di-t-butyl-4-methylphenol. The flow rate was 1.0 milliliter/minute and the injection size is 100 microliters.

Peak melting point (Tm) and peak crystallization temperature (Tc) were determined using the following procedure according to ASTM E 794-85. Differential scanning calorimetric (DSC) data was obtained using a TA Instruments model 2910 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity according to ASTM 3417-99. The percent crystallinity was calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene.

The glass transition temperature (Tg) was measured by ASTM E 1356 using a TA Instruments model 2910 machine.

Ethylene content for samples produced using fluorocarbon was determined using $^{13}C$ nuclear magnetic resonance

TABLE E1

Polymerization conditions using a mixture of fluorocarbon and hydrocarbon solvents and polymer properties

| | Run # | | | | |
|---|---|---|---|---|---|
| | V1 | V2 | V3 | V4 | V5 |
| Reaction temperature (° C.) | 80 | 80 | 80 | 80 | 80 |
| Propylene feed (g/min) | 14 | 14 | 14 | 14 | 14 |
| Ethylene feed (SLPM) | 2 | 4 | 6 | 2 | 2 |
| Hexane feed (ml/min) | 60 | 60 | 60 | 80 | 60 |
| HFC245fa feed (ml/min) | 20 | 20 | 20 | 20 | 20 |
| Catalyst | Catalyst A | Catalyst A | Catalyst A | Catalyst C | Catalyst C |
| Catalyst feed (mol/min) | 8.99E−07 | 8.99E−07 | 3.13E−07 | 2.23E−07 | 2.23E−07 |
| Yield (gram/min) | 13.2 | 16.7 | 13.7 | 8.5 | 8.9 |
| Conversion (%) | 81.3 | 90.3 | 66.0 | 52.6 | 54.8 |
| Mn (g/mol) | 27,800 | 27,200 | 47,700 | 35,800 | 115,700 |
| Mw (g/mol) | 63,600 | 65,100 | 111,000 | 94,600 | 272,800 |
| Mz (g/mol) | 113,500 | 121,400 | 200,400 | 197,300 | 527,600 |
| Mw/Mn | 2.3 | 2.4 | 2.3 | 2.6 | 2.4 |
| Ethylene content (%) | 16.5 | 31.9 | 44.4 | 17.0 | 17.7 |
| Tc (° C.) | | | 20.1 | | |
| Tm (° C.) | | | 42.5 | | |
| Tg (° C.) | −28.4 | −42.1 | −53.4 | −25.8 | −24.7 |
| Heat of fusion (J/g) | | | 2.3 | | |

HFC-245fa is 1,1,1,3,3-Pentafluoropropane obtained from Honeywell under the tradename Enovate 3000.

Tests and Materials.

Molecular weight (Mw, Mn, and Mz) and molecular weight distribution (Mw/Mn) of the polymers were determined using gel permeation chromatography (GPC) on a Water 150 C high temperature chromatographic unit equipped with a DRI detector and four linear mixed bed columns (Polymer Laboratories PLgel Mixed-B LS, 20-mi- (NMR). All the peaks in the NMR spectra are referenced by setting the nmumm methyl peak to 21.8 ppm. All secondary carbons are defined by the peak regions in Table A. Naming of the peaks was made in accordance with a method by Carman, et al. in *Rubber Chemistry and Technology*, 44 (1971), page 781, where e.g., $Sa_3$ denotes a peak area of the $\alpha\delta^+$ secondary carbon peak.

TABLE A

| ppm range | assignment |
|---|---|
| 45-48 | $S_{\alpha\alpha}$ |
| 36-39 | $S_{\alpha\delta} + S_{\alpha\gamma}$ |
| 34-36 | $S_{\alpha\beta}$ |
| 30.7 | $S_{\gamma\gamma}$ |
| 30.3 | $S_{\gamma\delta}$ |
| 29.9 | $S_{\delta\delta}$ |
| 27.5-27.7 | $S_{\beta\gamma}$ |
| 27.1-27.3 | $S_{\beta\delta}$ |
| 24.5-25 | $S_{\beta\beta}$ |

All tertiary carbons are defined by the peak regions in Table B (Note that the peak region of 30.7-31 ppm has overlapping peaks of secondary and tertiary carbons):

TABLE B

| ppm range | assignment |
|---|---|
| 33.6-34 | $T_{\gamma\gamma}$ |
| 33.4-33.6 | $T_{\gamma\delta}$ |
| 33.2 | $T_{\delta\delta}$ |
| 31-31.4 | $T_{\beta\gamma}$ |
| 30.7-31 | $(T_{\beta\delta} + S_{\gamma\gamma})$ |
| 28-29 | $T_{\beta\beta}$ |

The $T_{\beta\delta}$ and $S_{\gamma\gamma}$ peaks are overlapping. The area of $S_{\gamma\gamma}$ peak can be calculated as:

$$S_{\gamma\gamma} = (S_{\beta\delta} - S_{\gamma\delta})/2 \quad (A)$$

In Table A, the area of $S_{\gamma\gamma}$ peak was calculated by equation A, rather than by direct integration. Total area of secondary carbons (S) was calculated by the sum of all areas in Table A. Total area of tertiary carbons (T) was calculated by the sum of all areas in Table B subtracted by the area of $S_{\gamma\gamma}$ peak, as calculated by equation (A).

Total area of primary carbons (P) is the total area between 19 and 23 ppm.

Ethylene content was calculated by $$E \text{ wt \%} = (S - T/2 - P/2)/(S + T + P) \quad (B)$$

The ethylene content of ethylene/propylene copolymers produced using hydrocarbon solvent was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm$^{-1}$ to 4000 cm$^{-1}$ was recorded and the ethylene content in wt. % was calculated according to the following equation:

$$\text{ethylene content (wt. \%)} = 72.698 - 86.495X + 13.696X^2$$

where $X = AR/(AR+1)$. The area under propylene band at ~1165 cm$^{-1}$ and the area of ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. AR is the ratio of the area for the peak at ~1165 cm$^{-1}$ to the area of the peak at ~732 cm$^{-1}$.

Additional Experiments

EXAMPLES

A series of absorption experimental runs were conducted in a simple, lab-scale column to determine the absorption capacity of two different types of activated carbon obtained from a vendor. The absorption capacities were measured with both types of activated carbon using three different types of hydrofluorocarbon (HFC-134a, HFC-236fa, and HFC-245fa). Results of these experiments are shown in Tables I and II.

The absorption column was a ½ inch (1.27 cm) OD stainless steel tubing with valves fitted on either side. The ½ inch (1.27 cm) stainless steel tubing was 9⅞ inches long (25.1 cm) with an internal diameter of 0.430 inch (10.9 mm). The column was packed with one of two types of activated carbon obtained from Calgon Carbon Corporation. The first sample was described by the vendor as "Calgon Activated Carbon, Type AP4-60." The second was described as "Calgon Activated Carbon, Type OVC Plus 4×6." The AP4-60 activated carbon was in the form of cylindrically shaped pellets, while the OVC Plus material was in the form of flakes. Both of these carbons were crushed with a mortar and pestle to a smaller size to fit inside the absorption column. The crushing reduced the average size of the particles or flakes to approximately 25 to 50 percent of their original size, with some fines. Glass wool packing was inserted on both ends of the column (next to the valves) to prevent any carbon from entering in to the valve areas. The HFC-245fa was obtained from Honeywell, as marketed under their trade name Enovate 3000. The HFC-236fa was obtained from DuPont, marketed as SUVA 236fa. The HFC-134a was an automotive grade material, marketed as R-134a. These materials were used as received without purification.

The fluorocarbon was allowed to vaporize or boil from its holding container through a line that led to the bottom of the absorption column. Between the column and the HFC source were two rotameters (flow indicating devices). Each rotameter had a flow range of 50 ml/min of air at 21.1° C. at atmospheric pressure. The rotameters were arranged in parallel to provide a flow range of 100 ml/min of air at atmospheric pressure. (The actual flow range of the rotameter depends on the Mw of the gas. For a gas of known Mw, the actual flow rate can be obtained from the indicated flow rate using methods that are well known in the art.) On the exit side of the absorption column, a ¼ inch (0.64 cm) line was directed down to a coil of stainless steel tubing that was contained within a beaker of dry ice. The chilled coil of stainless steel tubing acted as a condenser to liquefy (and detect) fluorocarbon gas coming from the absorption column. The downstream end of the condenser coil was vented to the atmosphere within a fume hood. Prior to each run, the weight of the empty column (with glass wool and valves) was weighed and recorded as the tare weight. The column was weighed again after the addition of activated carbon. The column was then connected to the feed and exit lines, and fluorocarbon (as a gas) was passed through the adsorption column. The flow rate of fluorocarbon was set at an indicated 25 to 30 ml/min on each rotameter. Initially there was no fluorocarbon condensed in the coil, indicating that the fluorocarbon was being adsorbed by the activated carbon in the column. Flow through the column was continued until some liquid began to "spit" out of the end of the condenser. This indicated that fluorocarbon was no longer being adsorbed by the column, and the limiting adsorption capacity had been reached. The flow of fluorocarbon gas was allowed to continue one more minute to ensure complete saturation, and the flow was then stopped. The valves on either side of the absorption column were closed and then the column removed and weighed. The increase in weight of the absorption column was taken as the weight of fluorocarbon adsorbed. Upon the completion of the run, the valves were removed and the activated carbon was poured out to prepare for the next test. No gas release was observed when opening or removing the valves, indicating that the fluorocarbon initially adsorbed during the tests remained adsorbed on the activated carbon.

TABLE I

Activated Carbon Absorption Results With Fluorocarbon (FC)

| Activated Carbon Type | FC Type | FC Mw (g/mole) | Wt. Empty Tube, w/ valves (g) | Wt. of Tube w/ Carbon (g) |
|---|---|---|---|---|
| AP4-60 | HFC-245fa | 134 | 394.30 | 406.42 |
| AP4-60 | R-134a | 102 | 394.45 | 406.74 |
| AP4-60 | HFC-236fa | 152 | 394.41 | 407.14 |
| OVC Plus | HFC-236fa | 152 | 394.46 | 405.10 |
| OVC Plus | R-134a | 102 | 394.44 | 405.68 |
| OVC Plus | HFC-245fa | 134 | 394.45 | 405.65 |

TABLE II

| Activated Carbon Type | Wt. Carbon (g) | Wt. of Tube w/ Carbon & FC (g) | Wt. of FC Absorbed (g) | FC/C Ratio by Weight | FC/C Molar Ratio |
|---|---|---|---|---|---|
| AP4-60 | 12.12 | 412.75 | 6.33 | 0.522 | 0.0468 |
| AP4-60 | 12.29 | 410.93 | 4.19 | 0.341 | 0.0401 |
| AP4-60 | 12.73 | 413.81 | 6.67 | 0.524 | 0.0414 |
| OVC Plus | 10.64 | 411.39 | 6.29 | 0.591 | 0.0467 |
| OVC Plus | 11.24 | 410.92 | 5.24 | 0.466 | 0.0549 |
| OVC Plus | 11.20 | 412.39 | 6.74 | 0.602 | 0.0539 |

The above tests indicate that the activated carbon materials had surprisingly high adsorption capacities of between 34 to 60 percent of fluorocarbons by weight as indicated in Tables I and II. Thus un a preferred embodiment, the vent streams from a process could be purified (i.e. fluorocarbon removed) with reduced amounts of activated carbon than would normally be used in an activated carbon bed in a hydrocarbon process.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A solution olefin polymerization process, in which the olefin polymer is present as a solute in a polymerization medium, comprising introducing a fluorinated hydrocarbon into the polymerization medium in an amount effective to increase the amount of polymer solute in the polymerization medium by at least 3%, as compared to the same polymerization medium without the fluorinated hydrocarbon present, without causing precipitation of polymer solute from the polymerization medium, where the fluorinated hydrocarbon is not a perfluorinated C4 to C10 alkane, where the olefin polymer is at least 75 mole % hydrocarbon monomer and the monomers to be polymerized are not fluoromonomers.

2. A process for reducing the viscosity of an olefin polymerization effluent comprising introducing a fluorinated hydrocarbon into the polymerization effluent in an amount effective to reduce the viscosity of the polymerization effluent by at least 3% as compared to the same polymerization medium without the fluorinated hydrocarbon present, without causing precipitation of polymer solute from the polymerization effluent, where the fluorinated hydrocarbon is not a perfluorinated C4 to C10 alkane, wherein the polymer solute is a polymer of C2 to C40 linear or branched alpha-olefins.

3. The process of claim 1 wherein the polymerization medium comprises a hydrocarbon.

4. A solution olefin polymerization process, in which the olefin polymer is present as a solute in a polymerization medium, comprising introducing a fluorinated hydrocarbon into the polymerization medium in an amount effective to increase the amount of polymer solute in the polymerization medium by at least 3%, as compared to the same polymerization medium without the fluorinated hydrocarbon present, without causing precipitation of polymer solute from the polymerization medium, where the fluorinated hydrocarbon is not a perfluorinated C4 to C10 alkane, and wherein the polymerization medium comprises a hydrocarbon comprising one or more of propane, n-butane, isobutane, n-pentane, isopentane, cyclopentane, neopentane, n-hexane, isohexane, and cyclohexane.

5. The process of claim 1 where the fluorinated hydrocarbon is present at 0.1 to 20 volume %, based upon the volume of the polymerization medium or polymerization effluent.

6. The process of claim 1 wherein the fluorinated hydrocarbon is represented by the formula: $C_xH_yF_z$ wherein x is an integer from 1 to 40, y is an integer greater than or equal to 0 and z is an integer and is at least one.

7. The process of claim 1 wherein the fluorinated hydrocarbon comprises 1,1,1,3,3,3-hexafluoropropane.

8. The process of claim 1 where the fluorinated hydrocarbon comprises 1,1,1,2-tetrafluoroethane.

9. The process of claim 1 wherein the fluorinated hydrocarbon comprises a hydrofluorocarbon.

10. A solution olefin polymerization process, in which the olefin polymer: 1) comprises 100 mole % hydrocarbon monomer, and 2) is present as a solute in a polymerization medium, comprising introducing a fluorinated hydrocarbon into the polymerization medium in an amount effective to increase the amount of polymer solute in the polymerization medium by at least 3%, as compared to the same polymerization medium without the fluorinated hydrocarbon present, without causing precipitation of polymer solute from the polymerization medium, wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4- tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,2,3,3,4-hexafluorocyclobutane; and 1,1,2,2,3,3,4-heptafluorocyclobutane.

11. The process of claim 1 wherein the fluorinated hydrocarbon comprises one or more of difluoromethane, trifluoromethane, 1,1-difluoroethane, 1,1,1-trifluoroethane, fluoromethane, and 1,1,1,2-tetrafluoroethane.

12. The process of claim 1 wherein the fluorinated hydrocarbon comprises one or more of 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

13. The process of claim 1 wherein the polymerization medium comprises ethylene.

14. The process of claim 1 where the polymerization medium comprises propylene.

15. The process of claim 1, where the fluorinated hydrocarbon comprises octafluorocyclobutane.

16. The process of claim 1 where the fluorinated hydrocarbon is present at more than 5 weight %, based upon the weight of the fluorocarbon and any hydrocarbon solvent present in the reactor.

17. A process for reducing the viscosity of an olefin polymerization effluent comprising introducing a fluorinated hydrocarbon into the polymerization effluent in an amount effective to reduce the viscosity of the polymerization effluent by at least 3% as compared to the same polymerization medium without the fluorinated hydrocarbon present, without causing precipitation of polymer solute from the polymerization effluent, where the fluorinated hydrocarbon is not a perfluorinated C4 to C10 alkane, wherein the effluent is divided into streams including a waste stream and the waste stream is passed through activated carbon prior to being sent to a flare.

18. A process for reducing the viscosity of an olefin polymerization effluent comprising introducing a fluorinated hydrocarbon into the polymerization effluent in an amount effective to reduce the viscosity of the polymerization effluent by at least 3% as compared to the same polymerization medium without the fluorinated hydrocarbon present, without causing precipitation of polymer solute from the polymerization effluent, where the fluorinated hydrocarbon is not a perfluorinated C4 to C10 alkane, wherein the polymerization medium comprises a hydrocarbon and the hydrocarbon comprises one or more of propane, n-butane, isobutane, n-pentane, isopentane, cyclopentane, neopentane, n-hexane, isohexane, and cyclohexane.

19. A process for reducing the viscosity of an olefin polymerization effluent comprising olefin polymer comprising at least 100 mole % hydrocarbon monomer selected from the group consisting of ethylene, propylene, butene, pentene, hexene, heptene, octene, nonene, decene, undecene, dodecene, or mixtures thereof, said process comprising introducing a fluorinated hydrocarbon into the polymerization effluent in an amount effective to reduce the viscosity of the polymerization effluent by at least 3% as compared to the same polymerization medium without the fluorinated hydrocarbon present, without causing precipitation of polymer solute from the polymerization effluent, wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,2,3,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3- pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

20. The process of claim 2 wherein the fluorinated hydrocarbon comprises one or more of difluoromethane, trifluoromethane, 1,1-difluoroethane, 1,1,1-trifluoroethane, fluoromethane, and 1,1,1,2-tetrafluoroethane.

21. The process of claim 2 wherein the fluorinated hydrocarbon comprises one or more of 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

22. The process of claim 2 wherein the polymerization medium comprises ethylene.

23. The process of claim 2 where the polymerization medium comprises propylene.

24. The process of claim 2 where the fluorinated hydrocarbon is present at more than 5 weight %, based upon the weight of the fluorocarbon and any hydrocarbon solvent present in the reactor.

25. The process of claim 2 wherein the polymerization medium comprises a hydrocarbon.

* * * * *